(12) United States Patent
Kim et al.

(10) Patent No.: US 10,980,055 B2
(45) Date of Patent: Apr. 13, 2021

(54) METHOD FOR TRANSMITTING SIGNAL IN WIRELESS COMMUNICATION SYSTEM SUPPORTING UNLICENSED BAND, AND DEVICE SUPPORTING SAME

(71) Applicant: LG Electronics Inc., Seoul (KR)

(72) Inventors: Seonwook Kim, Seoul (KR); Suckchel Yang, Seoul (KR); Changhwan Park, Seoul (KR); Joonkui Ahn, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/893,616

(22) Filed: Jun. 5, 2020

(65) Prior Publication Data

US 2020/0305184 A1    Sep. 24, 2020

Related U.S. Application Data

(63) Continuation of application No. PCT/KR2019/001522, filed on Feb. 7, 2019.
(Continued)

(30) Foreign Application Priority Data

Aug. 9, 2018 (KR) .................. 10-2018-0092789
Nov. 9, 2018 (KR) .................. 10-2018-0137543
Jan. 10, 2019 (KR) .................. 10-2019-0003572

(51) Int. Cl.
*H04W 72/12* (2009.01)
*H04L 5/00* (2006.01)
(Continued)

(52) U.S. Cl.
CPC ....... *H04W 72/1289* (2013.01); *H04L 5/0048* (2013.01); *H04W 16/14* (2013.01); *H04W 74/0833* (2013.01)

(58) Field of Classification Search
CPC ............ H04W 72/1289; H04W 16/14; H04W 74/0833; H04L 5/0048
See application file for complete search history.

(56) References Cited

U.S. PATENT DOCUMENTS

2013/0039314 A1* 2/2013 Prateek ................. H04W 74/08
370/329
2018/0007662 A1* 1/2018 Chai ..................... H04L 1/1812
(Continued)

FOREIGN PATENT DOCUMENTS

EP          3668234       6/2020
KR        101531516       6/2015
(Continued)

OTHER PUBLICATIONS

Coolpad, "Considerations on NR-based Access to Unlicensed Spectrum," R1-1720602, 3GPP TSG RAN WG1 Meeting 91, Reno, USA, dated Nov. 27-Dec. 1, 2017, 3 pages.
(Continued)

*Primary Examiner* — Kashif Siddiqui
(74) *Attorney, Agent, or Firm* — Fish & Richardson P.C.

(57) ABSTRACT

The present disclosure relates to a method for transmitting a signal in a wireless communication system supporting an unlicensed band, and a device supporting the method. The method according to an embodiment of the present disclosure may comprises: performing a channel access procedure for multiple frequency bandwidth units included in an activated bandwidth part; and transmitting a data signal through an unlicensed band based on the channel access procedure.

18 Claims, 27 Drawing Sheets

Related U.S. Application Data

(60) Provisional application No. 62/663,196, filed on Apr. 26, 2018, provisional application No. 62/658,515, filed on Apr. 16, 2018, provisional application No. 62/627,674, filed on Feb. 7, 2018.

(51) Int. Cl.
*H04W 16/14* (2009.01)
*H04W 74/08* (2009.01)

(56) References Cited

U.S. PATENT DOCUMENTS

| | | | | |
|---|---|---|---|---|
| 2018/0279274 | A1* | 9/2018 | Sun | H04W 72/04 |
| 2018/0324861 | A1* | 11/2018 | Oh | H04W 72/1289 |
| 2019/0253200 | A1* | 8/2019 | Salem | H04W 72/042 |
| 2020/0100286 | A1* | 3/2020 | Xu | H04L 1/1887 |

FOREIGN PATENT DOCUMENTS

| | | |
|---|---|---|
| KR | 101741395 | 6/2017 |
| KR | 101794055 | 11/2017 |
| WO | WO2017217829 | 12/2017 |

OTHER PUBLICATIONS

Huawei, HiSilicon, "Coexistence and channel access for NR unlicensed band operations," R1-1800041, 3GPP TSG RAN WG1 Adhoc Meeting, Vancouver, Canada, dated Jan. 22-26, 2018, 7 pages.

Huawei, HiSilicon, "NR Numerology on unlicensed bands," R1-1800039, 3GPP TSG RAN WG1 Adhoc Meeting, Vancouver, Canada, dated Jan. 22-26, 2018, 6 pages.

LG Electronics, "Remaining issues on bandwidth parts," R1-1719935, 3GPP TSG RAN WG1 Meeting 91, Reno, USA, dated Nov. 27-Dec. 1, 2017, 7 pages.

PCT International Search Report and Written Opinion in International Application No. PCT/KR2019/001522, dated May 3, 2019, 21 pages. (with English translation).

Sony, "High Level Views on NR-U BWP," R1-1720475, 3GPP TSG RAN WG1 Meeting 91, Reno, US, dated Nov. 27-Dec. 2, 2017, 4 pages.

EP Extended European Search Report in European Appln. No. 19750713.0, dated Feb. 12, 2021, 17 pages.

Huawei, HiSilicon, "MAC Structure and Operation for URLLC," R2-1713339, 3GPP TSG-RAN2 Meeting #100, Reno, Nevada, dated Nov. 27-Dec. 1, 2017, 4 pages.

Huawei, HiSilicon, "NR Numerology on unlicensed bands," R1-1711465, 3GPP TSG RAN WG1 NR Ad Hoc Meeting, Qingdao, China, dated Jun. 27-30, 2017, 6 pages.

Huawei, HiSilicon, "Remaining issues on bandwidth part and wideband operation," R1-1800018, 3GPP TSG RAN WG1 NR Ad Hoc Meeting, Vancouver, Canada, dated Jan. 22-26, 2018, 14 pages.

Sequans Communications, "On multiple starting and ending positions in LAA UL subframe," R1-1714003, 3GPP TSG RAN WG1 Meeting #90, Prague, P.R. Czechia, dated Aug. 21-25, 2017, 4 pages.

* cited by examiner

Opt 1

Opt 2

# METHOD FOR TRANSMITTING SIGNAL IN WIRELESS COMMUNICATION SYSTEM SUPPORTING UNLICENSED BAND, AND DEVICE SUPPORTING SAME

CROSS-REFERENCE TO RELATED APPLICATIONS

This application is a continuation of International Application No. PCT/KR2019/001522, filed on Feb. 7, 2019, which claims the benefit of Korean Application No. 10-2019-0003572, filed on Jan. 10, 2019, Korean Application No. 10-2018-0137543, filed on Nov. 9, 2018, Korean Application No. 10-2018-0092789, filed on Aug. 9, 2018, U.S. Provisional Application No. 62/663,196, filed on Apr. 26, 2018, U.S. Provisional Application No. 62/658,515, filed on Apr. 16, 2018, and U.S. Provisional Application No. 62/627,674, filed on Feb. 7, 2018. The disclosures of the prior applications are incorporated by reference in their entirety.

TECHNICAL FIELD

The present disclosure relates to a wireless communication system, and more particularly, to a method of transmitting a signal in a wireless communication system supporting an unlicensed band and device for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

SUMMARY

The object of the present disclosure is to provide a method of transmitting a signal in a wireless communication system supporting an unlicensed band and device for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method of transmitting a signal in a wireless communication system supporting an unlicensed band and device for supporting the same.

In an aspect of the present disclosure, provided herein is a method of transmitting a signal by a transmission node in a wireless communication system supporting an unlicensed band. The method may include performing a channel access procedure for a plurality of frequency bandwidth units included in an active bandwidth part and transmitting a data signal in the unlicensed band based on the channel access procedure.

In an embodiment, the data signal configured based on a frequency bandwidth greater than a single frequency bandwidth unit may be transmitted in at least one frequency bandwidth unit determined by the channel access procedure.

In an embodiment, the data signal may be configured in the frequency bandwidth greater than the single frequency bandwidth unit according to a frequency-first mapping method.

In an embodiment, the data signal may include a plurality of blocks defined based on a plurality of frequency intervals and at least one time interval.

In an embodiment, the data signal may be mapped on a block basis according to the frequency-first mapping method.

In an embodiment, the signal transmission method may further include transmitting a demodulation reference signal (DM-RS).

In an embodiment, the transmission start time of the DM-RS may be determined according to a predetermined method.

In an embodiment, the predetermined method may include at least one of determining the transmission start time of the DM-RS based on the start time of the channel access procedure and the transmission start time of the data signal or determining the transmission start time of the DM-RS by shifting the location of a symbol to which the DM-RS is mapped based on the channel access procedure.

In an embodiment, transmitting the data signal may include transmitting the data signal by puncturing the data signal in at least one frequency bandwidth unit determined to be busy by the channel access procedure.

In an embodiment, the signal transmission method may further include transmitting the punctured data signal in at least one slot after a slot in which the data signal is transmitted.

In an embodiment, the at least one frequency bandwidth unit for transmitting the data signal may be determined to be idle by the channel access procedure.

In an embodiment, the signal transmission method may further include transmitting information on the at least one frequency bandwidth unit determined to be busy by the channel access procedure.

In an embodiment, the data signal may include a transmission block with a different redundancy version (RV) for each of the plurality of frequency bandwidth units.

In an embodiment, different RVs may have different RV indices.

In an embodiment, an RV index may be determined according to a predetermined method.

In an embodiment, the predetermined method may include at least one of determining the RV index based on scheduling downlink control information or determining the RV index based on a function related to the plurality of frequency bandwidth units.

In an embodiment, the frequency bandwidth greater than the single frequency bandwidth unit may be related to the active bandwidth part.

In another aspect of the present disclosure, provided herein is a communication device in a wireless communication system supporting an unlicensed band. The communication device may include a memory and at least one processor configured to control the memory.

In an embodiment, the at least one processor may be configured to perform a channel access procedure for a plurality of frequency bandwidth units included in an active bandwidth part and transmit a data signal in the unlicensed band based on the channel access procedure.

In an embodiment, the data signal configured based on a frequency bandwidth greater than a single frequency bandwidth unit may be transmitted in at least one frequency bandwidth unit determined by the channel access procedure.

In an embodiment, the data signal may include a plurality of blocks defined based on a plurality of frequency intervals and at least one time interval.

In an embodiment, the data signal may be mapped on a block basis according to a frequency-first mapping method.

In an embodiment, the at least one processor may be configured to transmit a DM-RS.

In an embodiment, the transmission start time of the DM-RS may be determined according to a predetermined method.

In an embodiment, the predetermined method may include at least one of determining the transmission start time of the DM-RS based on the start time of the channel access procedure and the transmission start time of the data signal or determining the transmission start time of the DM-RS by shifting the location of a symbol to which the DM-RS is mapped based on the channel access procedure.

In a further aspect of the present disclosure, provided herein is a transmission node in a wireless communication system supporting an unlicensed band. The transmission node may include a transmitter, a receiver, and at least one processor configured to control the transmitter and the receiver.

In an embodiment, the at least one processor may be configured to perform a channel access procedure for a plurality of frequency bandwidth units included in an active bandwidth part and transmit a data signal in the unlicensed band based on the channel access procedure.

In an embodiment, the data signal configured based on a frequency bandwidth greater than a single frequency bandwidth unit may be transmitted in at least one frequency bandwidth unit determined by the channel access procedure.

It is to be understood that both the foregoing general description and the following detailed description of the present disclosure are exemplary and explanatory and are intended to provide further explanation of the disclosure as claimed.

As is apparent from the above description, the embodiments of the present disclosure have the following effects.

According to the embodiments of the present disclosure, a method of transmitting a signal in a wireless communication system supporting an unlicensed band and device for supporting the same may be provided.

In particular, according to the embodiments of the present disclosure, even when data is not transmitted in some frequency bandwidths due to failure in a channel access procedure (CAP), data transmission in the remaining bandwidths may be guaranteed, thereby supporting efficient retransmission.

It will be appreciated by persons skilled in the art that the effects that could be achieved with the present disclosure are not limited to what has been particularly described hereinabove and other advantages of the present disclosure will be more clearly understood from the following detailed description.

BRIEF DESCRIPTION OF THE DRAWINGS

The accompanying drawings, which are included to provide a further understanding of the present disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

DETAILED DESCRIPTION

Figure 1:
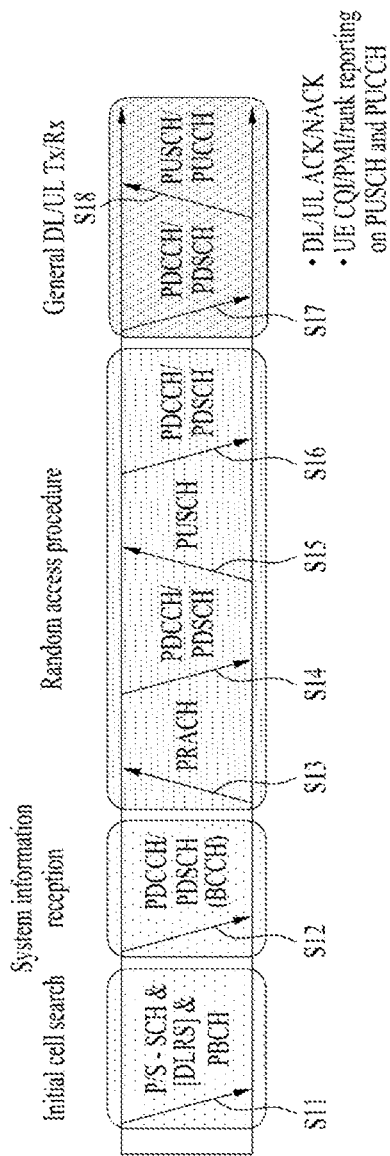
FIG. 1 is a diagram illustrating physical channels and a signal transmission method using the physical channels according to embodiments of the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided least it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 37.213, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems and 3GPP NR system are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

While the embodiments of the present disclosure are described in the context of 3GPP LTE/LTE-A systems and 3GPP NR system in order to clarify the technical features of the present disclosure, the present disclosure is also applicable to an IEEE 802.16e/m system, etc.

1. Overview of 3GPP System

1.1. Physical Channels and General Signal Transmission

In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to a BS. Specifically, the UE synchronizes its timing to the base station and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the base station.

During the initial cell search, the UE may monitor a DL channel state by receiving a Downlink Reference Signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2A:
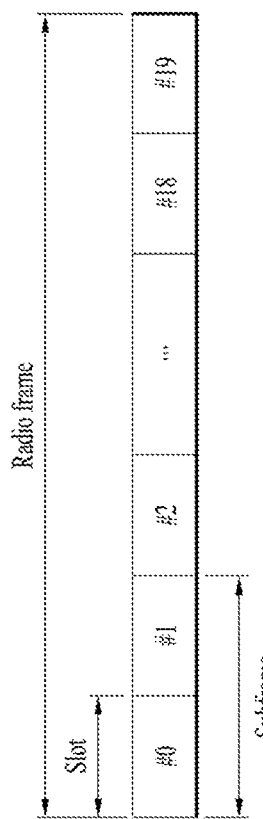
FIGS. 2A and 2B are diagrams illustrating radio frame structures.
Figure 2B:
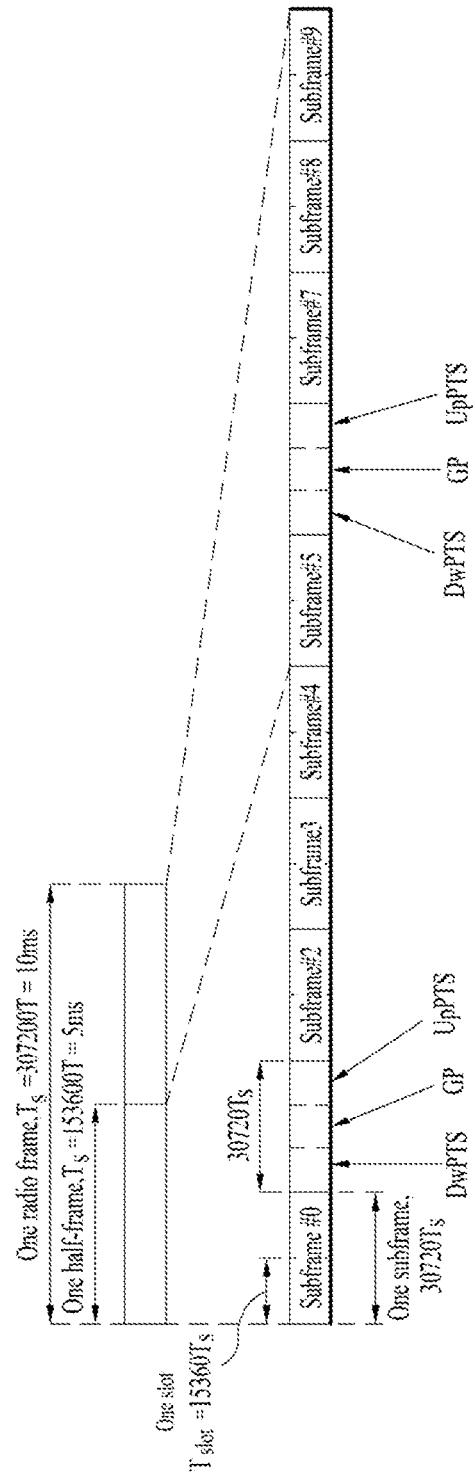
Figure 3:
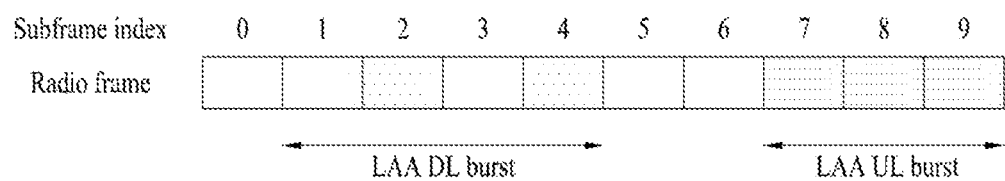
FIG. 3 is a diagram illustrating frame structure type 3.

FIGS. 2A to 3 are diagrams illustrating radio frame structures in an LTE system to which embodiments of the present disclosure are applicable.

The LTE system supports frame structure type 1 for frequency division duplex (FDD), frame structure type 2 for time division duplex (TDD), and frame structure type 3 for an unlicensed cell (UCell). In the LTE system, up to 31 secondary cells (SCells) may be aggregated in addition to a primary cell (PCell). Unless otherwise specified, the following operation may be applied independently on a cell basis.

In multi-cell aggregation, different frame structures may be used for different cells. Further, time resources (e.g., a subframe, a slot, and a subslot) within a frame structure may be generically referred to as a time unit (TU).

FIG. 2A illustrates frame structure type 1. Frame type 1 is applicable to both a full Frequency Division Duplex (FDD) system and a half FDD system.

A DL radio frame is defined by 10 1-ms subframes. A subframe includes 14 or 12 symbols according to a cyclic prefix (CP). In a normal CP case, a subframe includes 14 symbols, and in an extended CP case, a subframe includes 12 symbols.

Depending on multiple access schemes, a symbol may be an OFDM(A) symbol or an SC-FDM(A) symbol. For example, a symbol may refer to an OFDM(A) symbol on DL and an SC-FDM(A) symbol on UL. An OFDM(A) symbol may be referred to as a cyclic prefix-OFDMA(A) (CP-OFDM(A)) symbol, and an SC-FMD(A) symbol may be referred to as a discrete Fourier transform-spread-OFDM(A) (DFT-s-OFDM(A)) symbol.

One subframe may be defined by one or more slots according to a subcarrier spacing (SCS) as follows.
When SCS=7.5 kHz or 15 kHz, subframe #i is defined by two 0.5-ms slots, slot #2i and slot #2i+1 (i=0-9).
When SCS=1.25 kHz, subframe #i is defined by one 1-ms slot, slot #2i.
When SCS=15 kHz, subframe #i may be defined by six subslots as illustrated in Table 1.

Table 1 lists exemplary subslot configurations for one subframe (normal CP).

TABLE 1

| | Subslot number | | | | | |
|---|---|---|---|---|---|---|
| | 0 | 1 | 2 | 3 | 4 | 5 |
| | | | Slot number | | | |
| | | 2i | | | 2i + 1 | |
| Uplink subslot pattern (Symbol number) | 0, 1, 2 | 3, 4 | 5, 6 | 0, 1 | 2, 3 | 4, 5, 6 |

TABLE 1-continued

| | Subslot number | | | | | |
|---|---|---|---|---|---|---|
| | 0 | 1 | 2 | 3 | 4 | 5 |
| | | | Slot number | | | |
| | 2i | | | | 2i + 1 | |
| Downlink subslot pattern 1 (Symbol number) | 0, 1, 2 | 3, 4 | 5, 6 | 0, 1 | 2, 3 | 4, 5, 6 |
| Downlink subslot pattern 2 (Symbol number) | 0, 1 | 2, 3, 4 | 5, 6 | 0, 1 | 2, 3 | 4, 5, 6 |

FIG. 2B illustrates frame structure type 2. Frame structure type 2 is applied to a TDD system. Frame structure type 2 includes two half frames. A half frame includes 4 (or 5) general subframes and 1 (or 0) special subframe. According to a UL-DL configuration, a general subframe is used for UL or DL. A subframe includes two slots.

Table 2 lists exemplary subframe configurations for a radio frame according to UL-DL configurations.

TABLE 2

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D represents a DL subframe, U represents a UL subframe, and S represents a special subframe. A special subframe includes a downlink pilot time slot (DwPTS), a guard period (GP), and an uplink pilot time slot (UpPTS). The DwPTS is used for initial cell search, synchronization, or channel estimation at a UE. The UpPTS is used for channel estimation at an eNB and acquisition of UL transmission synchronization at a UE. The GP is a period for cancelling interference of a UL caused by the multipath delay of a DL signal between a DL and the UL.

Table 3 lists exemplary special subframe configurations.

In Table 3, X is configured by higher-layer signaling (e.g., radio resource control (RRC) signaling or the like) or given as 0.

FIG. 3 is a diagram illustrating frame structure type 3.

Frame structure type 3 may be applied to UCell operation. Frame structure type 3 may be applied to, but not limited to, a licensed assisted access (LAA) SCell with a normal CP. A frame is 10 ms in duration, including 10 1-ms subframes. Subframe #i is defined by two consecutive slots, slot #2i and slot #2i+1. Each subframe in a frame may be used for a DL or UL transmission or may be empty. A DL transmission occupies one or more consecutive subframes, starting from any time in a subframe and ending at a boundary of a subframe or in a DwPTS of Table 3. A UL transmission occupies one or more consecutive subframes.

Figure 4:
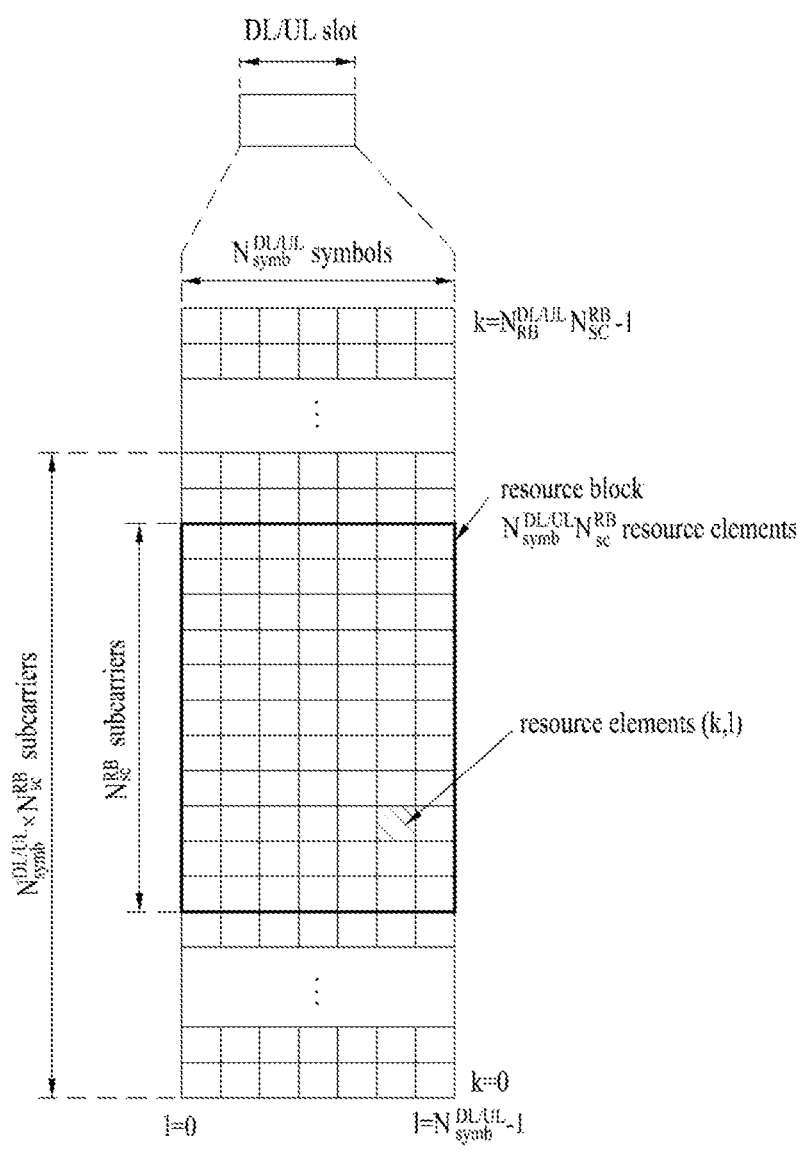
FIG. 4 is a diagram illustrating a slot structure in the LTE system to which the embodiments of the present disclosure are applicable.

FIG. 4 is a diagram illustrating a slot structure in an LTE system to which embodiments of the present disclosure are applied.

Referring to FIG. 4, a slot includes a plurality of OFDM symbols in the time domain by a plurality of resource blocks (RBs) in the frequency domain. A symbol may refer to a symbol duration. A slot structure may be described by a resource grid including $N^{DL/DL}_{RB}N^{RB}_{sc}$ subcarriers and $N^{DL/UL}_{symb}$ symbols. $N^{DL}RB$ denotes the number of RBs in a DL slot, and $N^{UL}RB$ denotes the number of RBs in a UL slot. $N^{DL}_{RB}$ and $N^{UL}_{RB}$ are dependent on a DL bandwidth and a UL bandwidth, respectively. $N^{DL}_{symb}$ denotes the number of symbols in the DL slot, and $N^{UL}_{symb}$ denotes the number of symbols in the UL slot. $N^{RB}_{sc}$ denotes the number of subcarriers in one RB. The number of symbols in a slot may vary depending on SCSs and CP lengths (see Table 1). For example, while one slot includes 7 symbols in a normal CP case, one slot includes 6 symbols in an extended CP case.

An RB is defined as $N^{DL/UL}_{symb}$ (e.g., 7) consecutive symbols in the time domain by $N^{RB}_{sc}$ (e.g., 12) consecutive subcarriers in the frequency domain. The RB may be a physical resource block (PRB) or a virtual resource block (VRB), and PRBs may be mapped to VRBs in a one-to-one correspondence. Two RBs each being located in one of the two slots of a subframe may be referred to as an RB pair. The two RBs of an RB pair may have the same RB number (or RB index). A resource with one symbol by one subcarrier is referred to as a resource element (RE) or tone. Each RE in the resource grid may be uniquely identified by an index pair (k, l) in a slot, where k is a frequency-domain index ranging from 0 to $N^{DL/UL}\times N^{RB}_{sc}-1$ and l is a time-domain index ranging from 0 to $N^{DL/DL}_{symb}-1$.

TABLE 3

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | (1 + X) · 2192 · $T_s$ | (1 + X) · 2560 · $T_s$ | 7680 · $T_s$ | (1 + X) · 2192 · $T_s$ | (1 + X) · 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | (2 + X) · 2192 · $T_s$ | (2 + X) · 2560 · $T_s$ |
| 5 | 6592 · $T_s$ | (2 + X) · 2192 · $T_s$ | (2 + X) · 2560 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |
| 10 | 13168 · $T_s$ | 13152 · $T_s$ | 12800 · $T_s$ | — | — | — |

Figure 5:
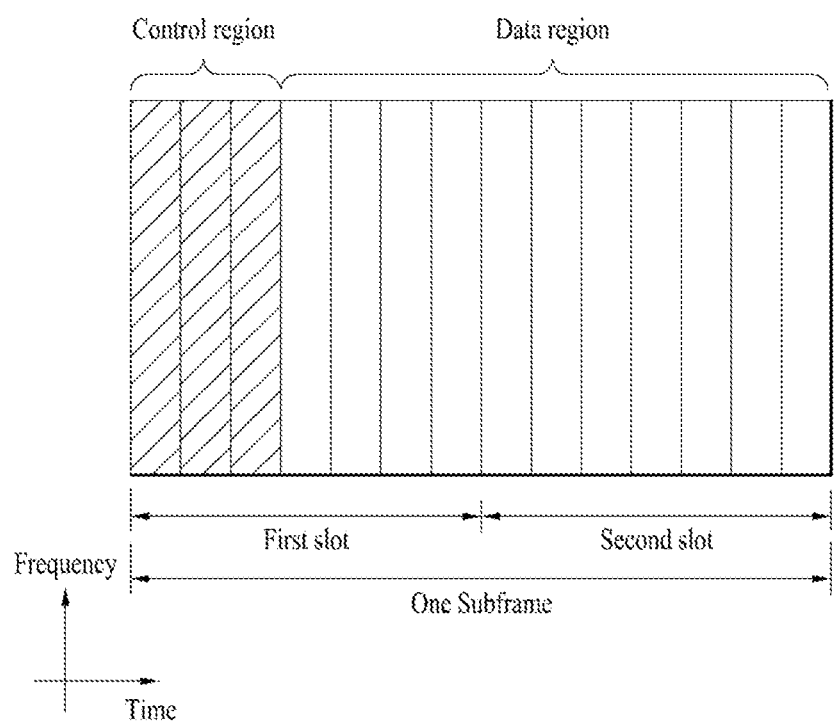
FIG. 5 is a diagram illustrating a downlink subframe structure in the LTE system to which the embodiments of the present disclosure are applicable.

FIG. 5 illustrates a DL subframe structure in an LTE system to which embodiments of the present disclosure are applicable.

Referring to FIG. 5, up to three (or four) OFDM(A) symbols at the beginning of the first slot of a subframe corresponds to a control region. The remaining OFDM(A) symbols correspond to a data region in which a PDSCH is allocated, and a basic resource unit of the data region is an RB. DL control channels include a physical control format indicator channel (PCFICH), a physical downlink control channel (PDCCH), a physical hybrid-ARQ indicator channel (PHICH), and so on.

The PCFICH is transmitted in the first OFDM symbol of a subframe, carrying information about the number of OFDM symbols (i.e., the size of a control region) used for transmission of control channels in the subframe. The PHICH is a response channel for a UL transmission, carrying a hybrid automatic repeat request (HARD) acknowledgement (ACK)/negative acknowledgement (NACK) signal. Control information delivered on the PDCCH is called downlink control information (DCI). The DCI includes UL resource allocation information, DL resource control information, or a UL transmit (TX) power control command for any UE group.

Figure 6:
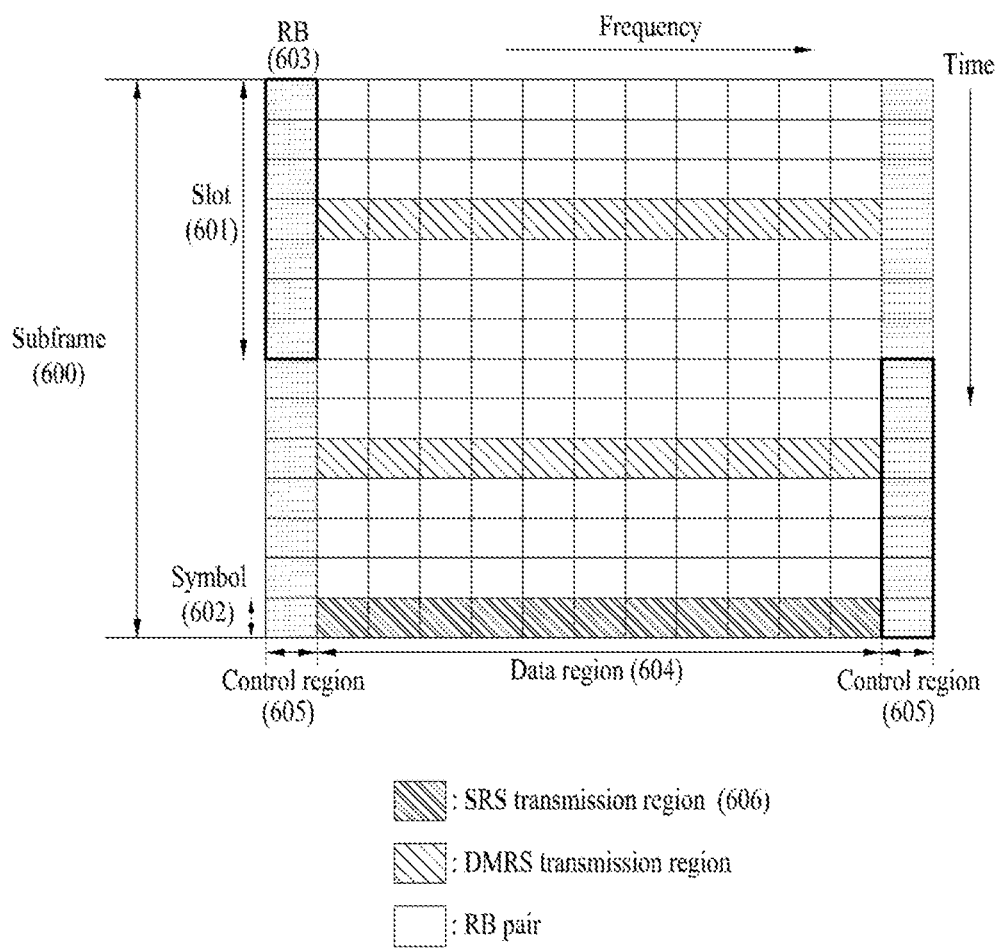
FIG. 6 is a diagram illustrating an uplink subframe structure in the LTE system to which the embodiments of the present disclosure are applicable.

FIG. 6 is a diagram illustrating a UL subframe structure in an LTE system to which embodiments of the present disclosure are applicable.

Referring to FIG. 6, one subframe 600 includes two 0.5-ms slots 601. Each slot includes a plurality of symbols 602, each corresponding to one SC-FDMA symbol. An RB 603 is a resource allocation unit corresponding to 12 subcarriers in the frequency domain by one slot in the time domain.

A UL subframe is divided largely into a data region 604 and a control region 605. The data region is communication resources used for each UE to transmit data such as voice, packets, and so on, including a physical uplink shared channel (PUSCH). The control region is communication resources used for each UE to transmit an ACK/NACK for a DL channel quality report or a DL signal, a UL scheduling request, and so on, including a physical uplink control channel (PUCCH).

A sounding reference signal (SRS) is transmitted in the last SC-FDMA symbol of a subframe in the time domain.

Figure 7:
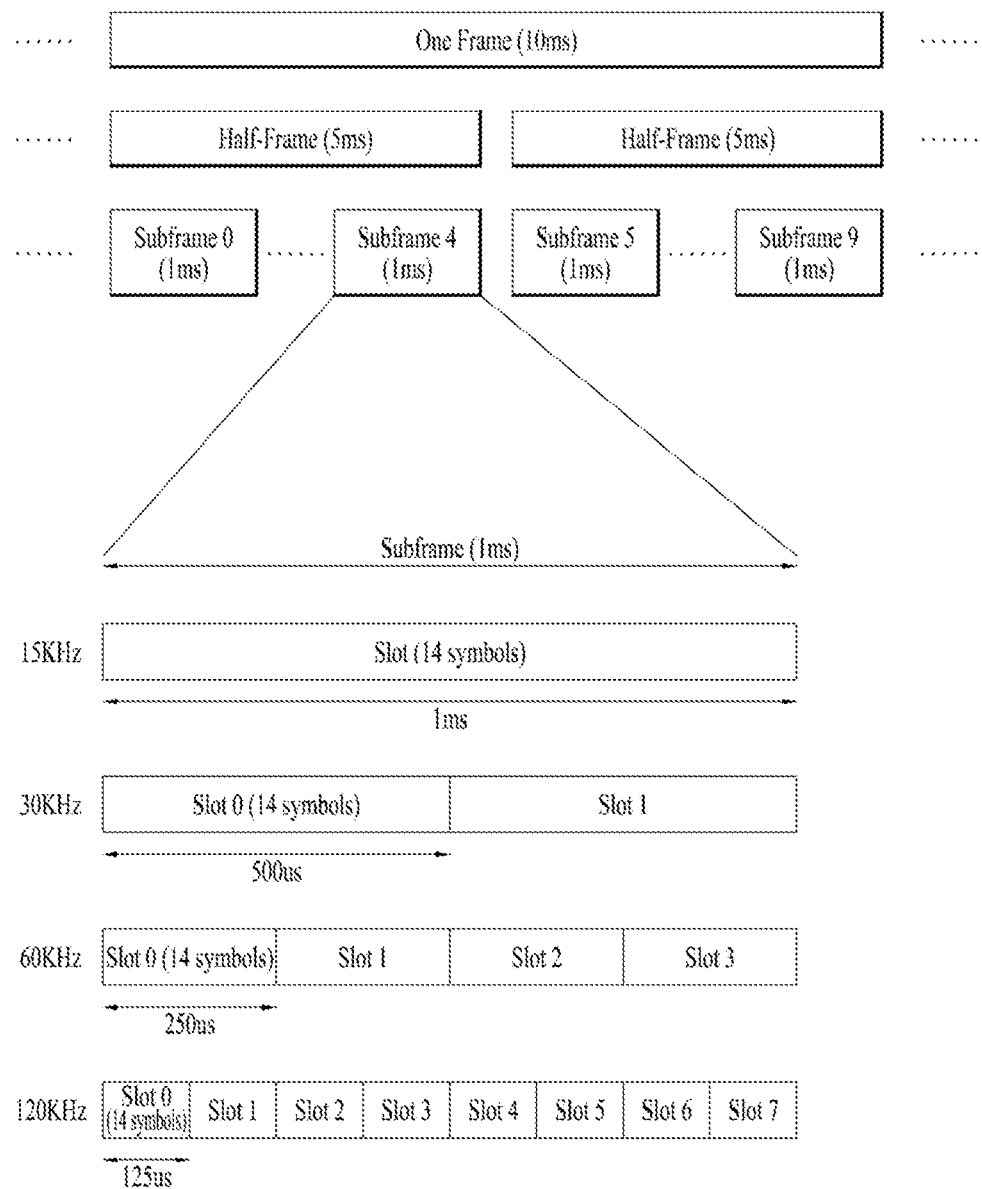
FIG. 7 is a diagram illustrating a radio frame structure in a new radio access technology (NR) system to which the embodiments of the present disclosure are applicable.

FIG. 7 is a diagram illustrating a radio frame structure in an NR system to which embodiments of the present disclosure are applicable.

In the NR system, UL and DL transmissions are based on a frame as illustrated in FIG. 7. One radio frame is 10 ms in duration, defined as two 5-ms half-frames. One half-frame is defined as five 1-ms subframes. One subframe is divided into one or more slots, and the number of slots in a subframe depends on an SCS. Each slot includes 12 or 14 OFDM(A) symbols according to a CP. Each slot includes 14 symbols in a normal CP case, and 12 symbols in an extended CP case. Herein, a symbol may include an OFDM symbol (or a CP-OFDM symbol) and an SC-FDMA symbol (or a DFT-s-OFDM symbol).

Table 4 lists the number of symbols per slot, the number of slots per frame, and the number of slots per subframe in the normal CP case, and Table 5 lists the number of symbols per slot, the number of slots per frame, and the number of slots per subframe in the extended CP case.

TABLE 4

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, $N^{slot}_{symb}$ denotes the number of symbols in a slot, $N^{frame,\mu}_{slot}$ denotes the number of slots in a frame, and $N^{subframe,\mu}_{slot}$ denotes the number of slots in a subframe.

In the NR system to which the present disclosure is applicable, different OFDM(A) numerologies (e.g., SCSs, CP length, and so on) may be configured for a plurality of cells aggregated for a UE. Therefore, the (absolute) duration of a time resource (e.g., an SF, slot, or TTI) (for the convenience of description, generically referred to as a time unit (TU)) including the same number of symbols may be different between the aggregated cells.

Figure 8:
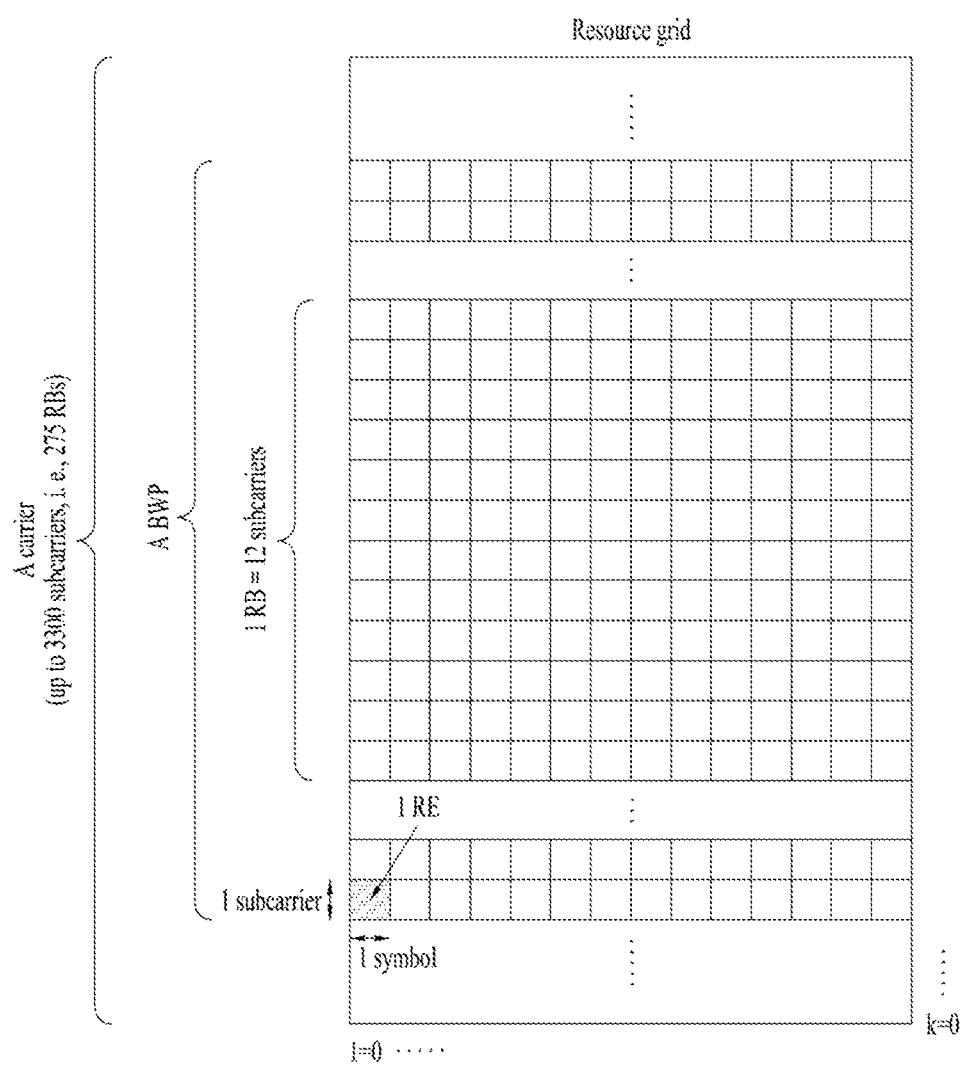
FIG. 8 is a diagram illustrating a slot structure in the NR system to which the embodiments of the present disclosure are applicable.

FIG. 8 is a diagram illustrating a slot structure in an NR system to which embodiments of the present disclosure are applicable.

One slot includes a plurality of symbols in the time domain. For example, one slot includes 7 symbols in a normal CP case and 6 symbols in an extended CP case.

A carrier includes a plurality of subcarriers in the frequency domain. An RB is defined as a plurality of (e.g., 12) consecutive subcarriers in the frequency domain.

A bandwidth part (BWP) is defined as a plurality of consecutive (P)RBs in the frequency domain and may correspond to one numerology (e.g., SCS, CP length, and so on).

A carrier may include up to N (e.g., 5) BWPs. Data communication may be conducted in an active BWP, and only one BWP may be activated for one UE. In a resource grid, each element is referred to as an RE, to which one complex symbol may be mapped.

Figure 9:
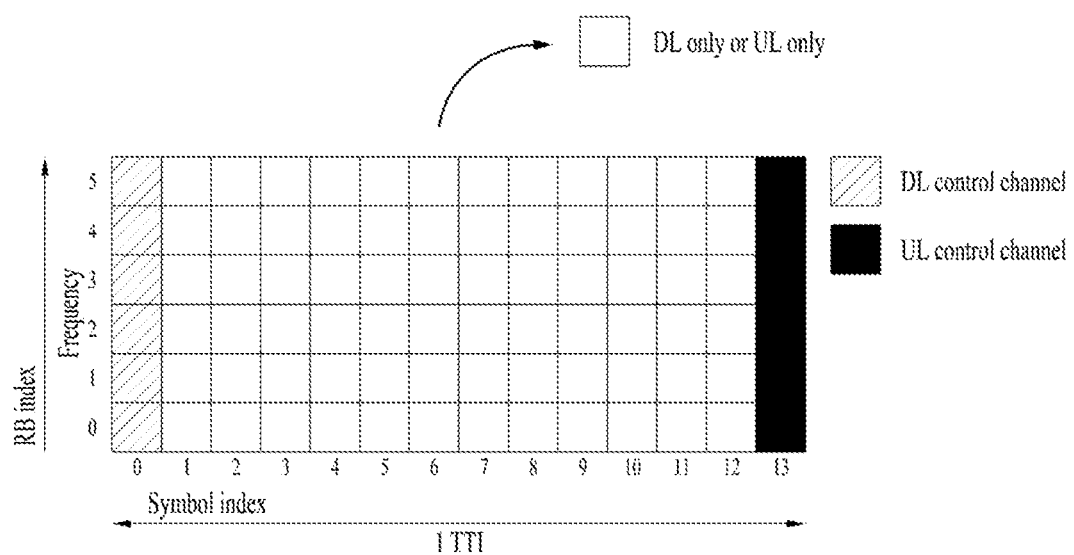
FIG. 9 is a diagram illustrating a self-contained slot structure in the NR system to which the embodiments of the present disclosure are applicable.

FIG. 9 is a diagram illustrating a self-contained slot structures in an NR system to which embodiments of the present disclosure are applicable.

In FIG. 9, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, an eNB and a UE may sequentially perform DL transmission and UL transmission in one slot. That is, the eNB and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the eNB and UE to switch from transmission mode to reception mode and vice versa. To this end, in the self-contained slot structure, some OFDM symbols at the time of switching from DL to UL may be configured as a guard period (GP).

Although it has been described above that the self-contained slot structure includes both DL and UL control regions, these control regions may be selectively included in the self-contained slot structure. In other words, the self-contained slot structure according to the present disclosure may include either the DL control region or the UL control region as well as both the DL and UL control regions as illustrated in FIG. 9.

Further, the order of regions in one slot may vary in some embodiments. For example, one slot may be configured in the following order: DL control region, DL data region, UL control region, and UL data region, or UL control region, UL data region, DL control region, and DL data region.

A PDCCH may be transmitted in the DL control region, and a PDSCH may be transmitted in the DL data region. A PUCCH may be transmitted in the UL control region, and a PUSCH may be transmitted in the UL data region.

The PDCCH may deliver downlink control information (DCI), for example, DL data scheduling information, UL data scheduling information, and so on. The PUCCH may deliver uplink control information (UCI), for example, an ACK/NACK for DL data, channel state information (CSI), a scheduling request (SR), and so on.

The PDSCH carries DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer is mapped to resources together with a demodulation reference signal (DMRS or DM-RS), created as an OFDM symbol signal, and then transmitted through a corresponding antenna port.

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined as one OFDM symbol by one (P)RB.

Figure 10:
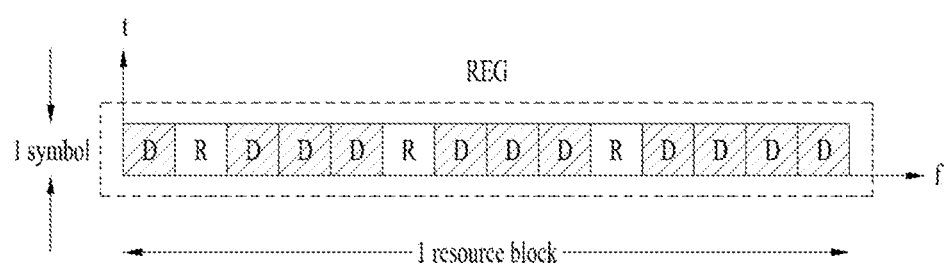
FIG. 10 is a diagram illustrating a resource element group (REG) structure in the NR system to which the embodiments of the present disclosure are applicable.

FIG. 10 is a diagram illustrating the structure of one REG in an NR system to which embodiments of the present disclosure are applicable.

In FIG. 10, D denotes an RE to which DCI is mapped, and R denotes an RE to which a DMRS is mapped. The DMRS is mapped to REs #1, #5, and #9 along the frequency axis in one symbol.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The PUSCH carries UL data (e.g., UL-shared channel transport block (UL-SCH TB)) and/or UCI and is transmitted based on a CP-OFDM waveform or a DFT-s-OFDM waveform. When the PUSCH is transmitted in the DFT-s-OFDM waveform, the UE transmits the PUSCH by applying transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. PUSCH transmission may be dynamically scheduled by a UL grant in DCI, or semi-statically scheduled by higher-layer (e.g., RRC) signaling (and/or layer 1 (L1) signaling such as a PDCCH) (configured grant). Both codebook based PUSCH transmission and non-codebook based PUSCH transmission may be allowed.

The PUCCH carries UCI, an HARQ-ACK, and/or an SR. Depending on the transmission duration of the PUCCH, the PUCCH is classified into a short PUCCH and a long PUCCH. Table 6 lists exemplary PUCCH formats.

TABLE 6

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 1-14 | ≤2 | HARQ, [SR] | Sequence moclulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI of up to 2 bits and is mapped in a sequence-based manner, for transmission. Specifically, the UE transmits specific UCI to the eNB by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 carries UCI of up to 2 bits and modulation symbols are spread with an orthogonal cover code (OCC) (which is configured differently depending on whether frequency hopping is performed) in the time domain. The DMRS is transmitted in a symbol in which a modulation symbol is not transmitted (i.e., transmitted by time division multiplexing (TDM)).

PUCCH format 2 carries UCI of more than 2 bits and modulation symbols are transmitted by frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBs and carries UCI of more than 2 bits. In other words, PUCCH resources of PUCCH format 3 include no OCC. Modulation symbols are transmitted by TDM with the DMRS.

PUCCH format 4 supports multiplexing of up to 4 UEs in the same PRBs and carries UCI of more than 2 bits. In other words, PUCCH resources of PUCCH format 3 includes an OCC. Modulation symbols are transmitted in TDM with the DMRS.

1.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 11:
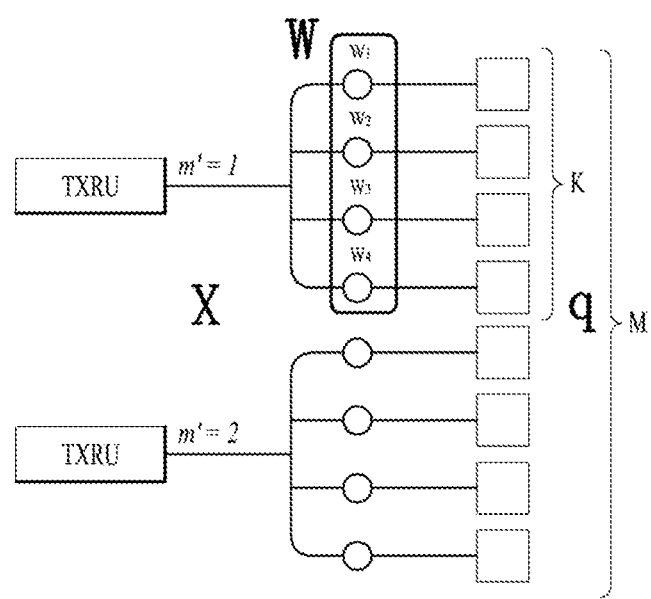
FIGS. 11 and 12 are diagrams illustrating representative methods of connecting transceiver units (TXRUs) to antenna elements.
Figure 12:
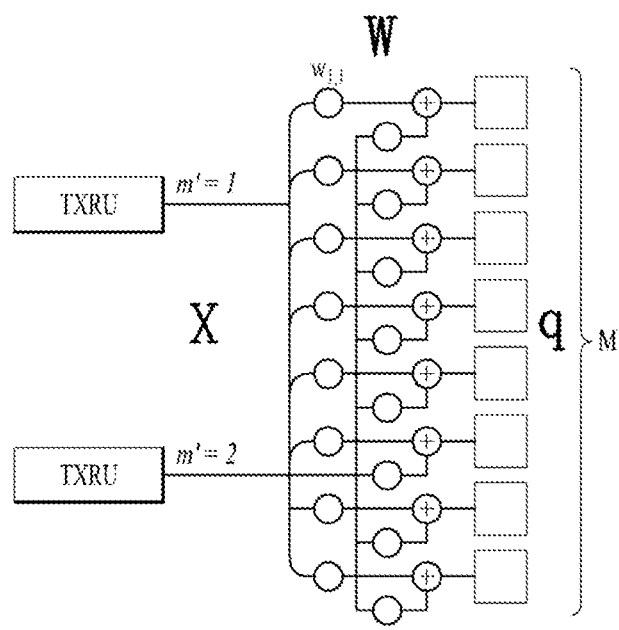

FIGS. 11 and 12 are diagrams illustrating representative methods for connecting TXRUs to antenna elements. Here, the TXRU virtualization model represents the relationship between TXRU output signals and antenna element output signals.

FIG. 11 shows a method for connecting TXRUs to subarrays. In FIG. 11, one antenna element is connected to one TXRU.

Meanwhile, FIG. 12 shows a method for connecting all TXRUs to all antenna elements. In FIG. 12, all antenna elements are connected to all TXRUs. In this case, separate addition units are required to connect all antenna elements to all TXRUs as shown in FIG. 12.

In FIGS. 11 and 12, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 11 has a disadvantage in that it is difficult to achieve beamforming focusing but has an advantage in that all antennas can be configured at low cost.

On the contrary, the configuration shown in FIG. 12 is advantageous in that beamforming focusing can be easily achieved. However, since all antenna elements are connected to the TXRU, it has a disadvantage of high cost.

When a plurality of antennas is used in the NR system to which the present disclosure is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

Figure 13:
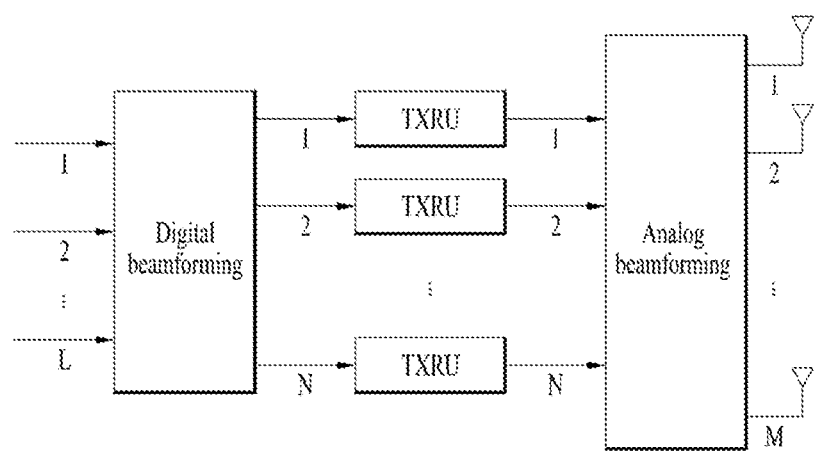
FIG. 13 is a schematic diagram illustrating a hybrid beamforming structure from the perspective of TXRUs and physical antennas according to an example of the present disclosure.

FIG. 13 is a diagram schematically illustrating an exemplary hybrid BF structure from the perspective of TXRUs and physical antennas according to the present disclosure. In FIG. 13, the number of digital beams is L and the number analog beams is N.

Additionally, in the NR system to which the present disclosure is applicable, an BS designs analog BF to be changed in units of symbols to provide more efficient BF support to a UE located in a specific area. Furthermore, as illustrated in FIG. 13, when N specific TXRUs and M RF antennas are defined as one antenna panel, the NR system according to the present disclosure considers introducing a plurality of antenna panels to which independent hybrid BF is applicable.

In the case in which the BS utilizes a plurality of analog beams as described above, the analog beams advantageous for signal reception may differ according to a UE. Therefore, in the NR system to which the present disclosure is applicable, a beam sweeping operation is being considered in which the BS transmits signals (at least synchronization signals, system information, paging, and the like) by applying different analog beams in a specific subframe (SF) or slot on a symbol-by-symbol basis so that all UEs may have reception opportunities.

Figure 14:
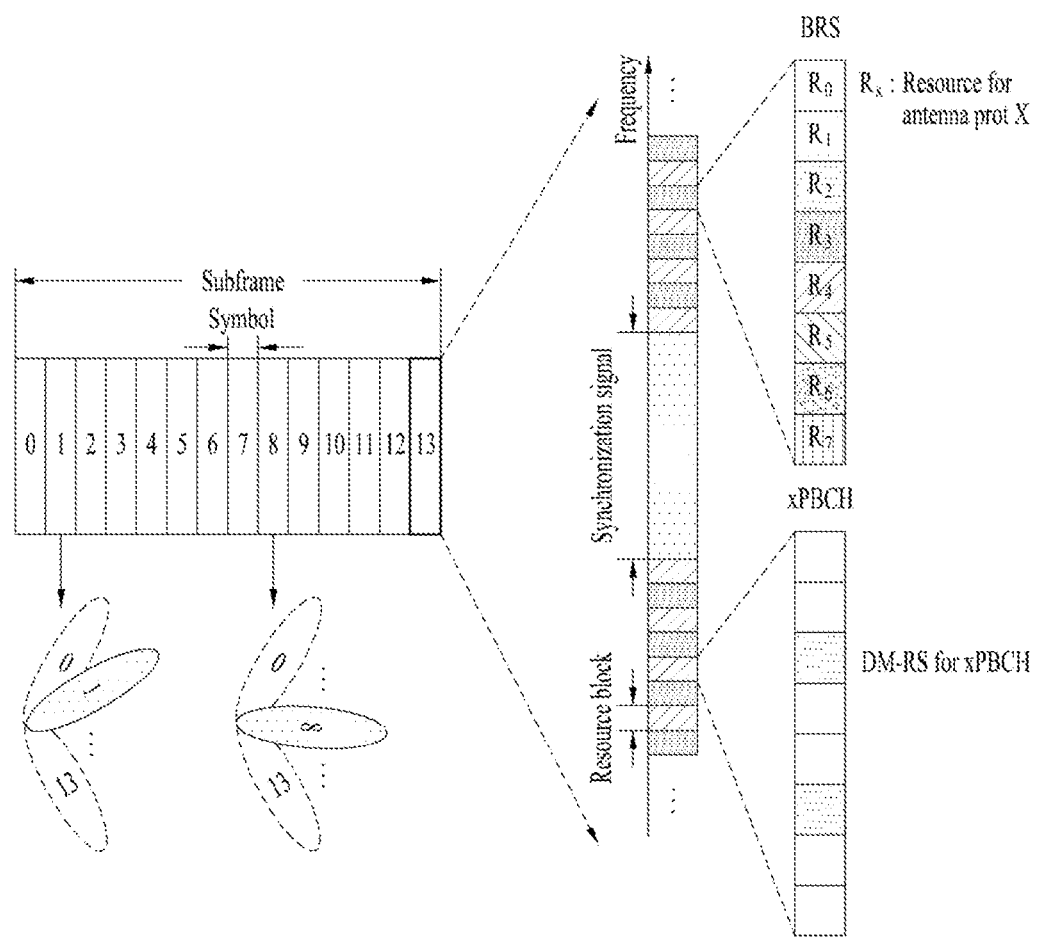
FIG. 14 is a schematic diagram illustrating a beam sweeping operation for a synchronization signal and system information in a downlink transmission procedure according to an example of the present disclosure.

FIG. 14 is a diagram schematically illustrating an exemplary beam sweeping operation for a synchronization signal and system information in a DL transmission procedure according to the present disclosure.

In FIG. 14 below, a physical resource (or physical channel) on which the system information of the NR system to which the present disclosure is applicable is transmitted in a broadcasting manner is referred to as an xPBCH. Here, analog beams belonging to different antenna panels within one symbol may be simultaneously transmitted.

As illustrated in FIG. 14, in order to measure a channel for each analog beam in the NR system to which the present disclosure is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

1.4. Synchronization Signal Block (SSB) or SS/PBCH Block

In the NR system to which the present disclosure is applicable, a primary synchronization signal (PSS), a secondary synchronization signal (SSS), and/or a physical broadcast signal (PBCH) may be transmitted in one SS block or SS PBCH block (hereinafter, referred to as an SSB or SS/PBCH block). Multiplexing other signals may not be precluded within the SSB.

The SS/PBCH block may be transmitted in a band other than the center of a system band. Particularly, when the BS supports broadband operation, the BS may transmit multiple SS/PBCH blocks.

Figure 15:
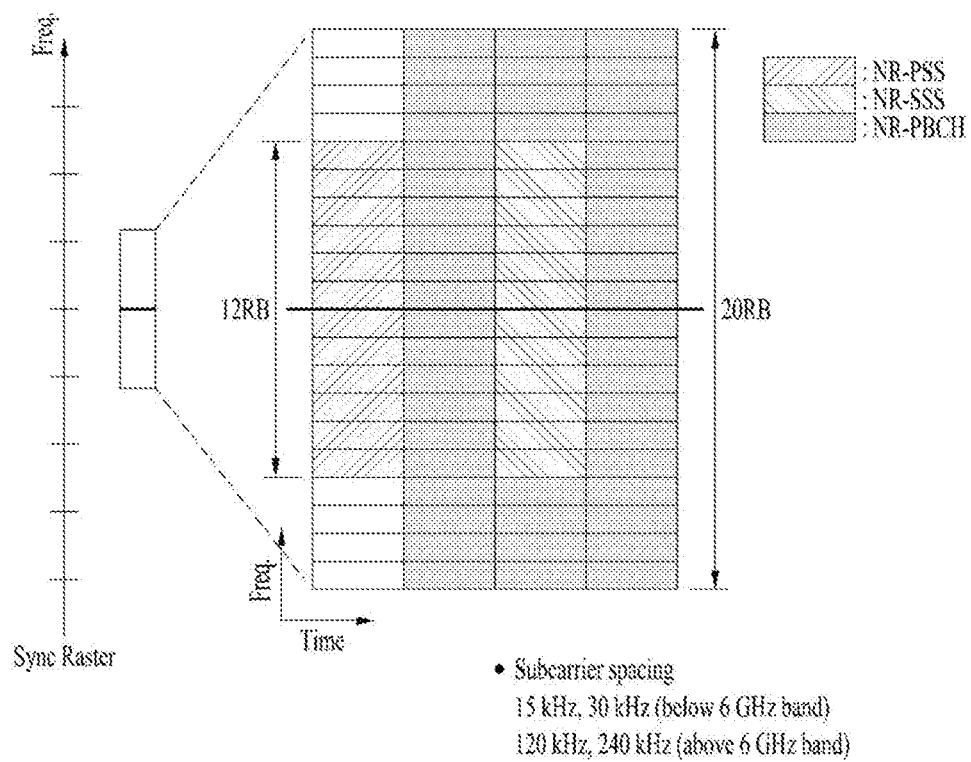
FIG. 15 is a schematic diagram illustrating a synchronization signal/physical broadcast channel (SS/PBCH) block applicable to the present disclosure.

FIG. 15 is a schematic diagram illustrating an SS/PBCH block applicable to the present disclosure.

As illustrated in FIG. 15, the SS/PBCH block applicable to the present disclosure may include 20 RBs in four consecutive OFDM symbols. Further, the SS/PBCH block may include a PSS, an SSS, and a PBCH, and the UE may perform cell search, system information acquisition, beam alignment for initial access, DL measurement, and so on based on the SS/PBCH block.

Each of the PSS and the SSS includes one OFDM symbol by 127 subcarriers, and the PBCH includes three OFDM symbols by 576 subcarriers. Polar coding and QPSK are applied to the PBCH. The PBCH includes data REs and DMRS REs in every OFDM symbol. There are three DMRS REs per RB, with three data REs between every two adjacent DMRS REs.

Further, the SS/PBCH block may be transmitted even in a frequency band other than the center frequency of a frequency band used by the network.

For this purpose, a synchronization raster being candidate frequency positions at which the UE should detect the SS/PBCH block is defined in the NR system to which the present disclosure is applicable. The synchronization raster may be distinguished from a channel raster.

In the absence of explicit signaling of the position of the SS/PBCH block, the synchronization raster may indicate available frequency positions for the SS/PBCH block, at which the UE may acquire system information.

The synchronization raster may be determined based on a global synchronization channel number (GSCN). The GSCN may be transmitted by RRC signaling (e.g., an MIB, a system information block (SIB), remaining minimum system information (RMSI), other system information (OSI), or the like).

The synchronization raster is defined to be longer along the frequency axis than the channel raster and characterized by a smaller number of blind detections than the channel raster, in consideration of the complexity of initial synchronization and a detection speed.

Figure 16:
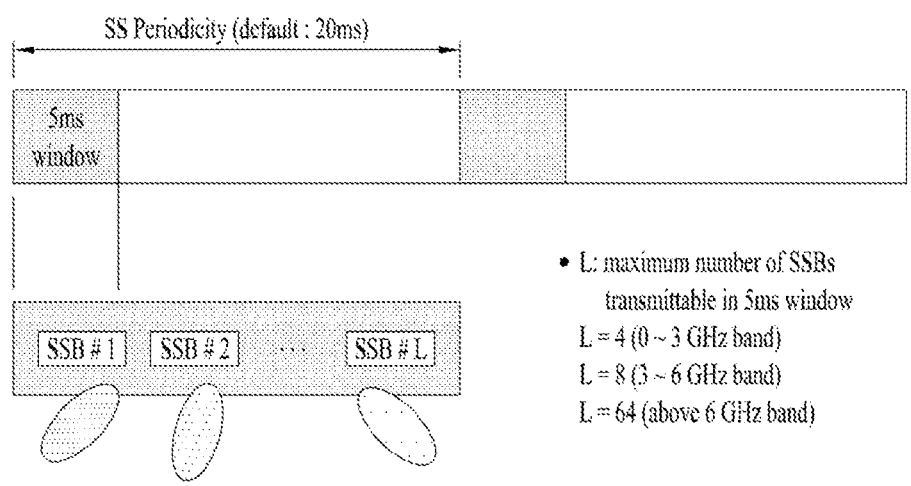
FIG. 16 is a schematic diagram illustrating an SS/PBCH block transmission configuration applicable to the present disclosure.

FIG. 16 is a schematic diagram illustrating an SS/PBCH block transmission structure applicable to the present disclosure.

In the NR system to which the present disclosure is applicable, the BS may transmit an SS/PBCH block up to 64 times for 5 ms. The multiple SS/PBCH blocks may be transmitted on different beams, and the UE may detect the SS/PBCH block on the assumption that the SS/PBCH block is transmitted on a specific one beam every 20 ms.

As the frequency band is higher, the BS may set a larger maximum number of beams available for SS/PBCH block transmission within 5 ms. For example, the BS may transmit the SS/PBCH block by using up to 4 different beams at or below 3 GHz, up to 8 different beams at 3 to 6 GHz, and up to 64 different beams at or above 6 GHz, for 5 ms.

1.5. Synchronization Procedure

The UE may acquire synchronization by receiving the above-described SS/PBCH block from the BS. The synchronization procedure largely includes cell ID detection and timing detection. The cell ID detection may include PSS-based cell ID detection and SSS-based cell ID detection. The timing detection may include PBCH DMRS-based timing detection and PBCH contents-based (e.g., MIB-based) timing detection.

First, the UE may acquire timing synchronization and the physical cell ID of a detected cell by detecting a PSS and an SSS. More specifically, the UE may acquire the symbol timing of the SS block and detect a cell ID within a cell ID group, by PSS detection. Subsequently, the UE detects the cell ID group by SSS detection.

Further, the UE may detect the time index (e.g., slot boundary) of the SS block by the DMRS of the PBCH. The UE may then acquire half-frame boundary information and system frame number (SFN) information from an MIB included in the PBCH.

The PBCH may indicate that a related (or corresponding) RMSI PDCCH/PDSCH is transmitted in the same band as or a different band from that of the SS/PBCH block. Accordingly, the UE may then receive RMSI (e.g., system information other than the MIB) in a frequency band indicated by the PBCH or a frequency band carrying the PBCH, after decoding of the PBCH.

In relation to the operation, the UE may acquire system information.

The MIB includes information/parameters required for monitoring a PDCCH that schedules a PDSCH carrying SystemInformationBlock1 (SIB1), and is transmitted to the UE on the PBCH in the SS/PBCH block by the gNB.

The UE may check whether there is a CORESET for a Type0-PDCCH common search space, based on the MIB. The Type0-PDCCH common search space is a kind of PDCCH search space and used to transmit a PDCCH that schedules an SI message.

In the presence of a Type0-PDCCH common search space, the UE may determine (i) a plurality of contiguous RBs included in the CORESET and one or more consecutive symbols and (ii) a PDCCH occasion (e.g., a time-domain position for PDCCH reception), based on information (e.g., pdcch-ConfigSIB1) included in the MIB.

In the absence of a Type0-PDCCH common search space, pdcch-ConfigSIB1 provides information about a frequency position at which the SSB/SIB1 exists and a frequency range in which the SSB/SIB1 does not exist.

SIB1 includes information about the availability and scheduling of the other SIBs (hereinafter, referred to as SIBx where x is 2 or a larger integer). For example, SIB1 may indicate whether SIBx is periodically broadcast or provided in an on-demand manner (or upon request of the UE). When SIBx is provided in the on-demand manner, SIB1 may include information required for an SI request of the UE. SIB1 is transmitted on a PDSCH. A PDCCH that schedules SIB1 is transmitted in a Type0-PDCCH common search space, and SIB1 is transmitted on a PDSCH indicated by the PDCCH.

1.6. Quasi Co-Located or Quasi Co-Location (QCL)

In the present disclosure, QCL may mean one of the following.

(1) If two antenna ports are "quasi co-located (QCL)", the UE may assume that large-scale properties of a signal received from a first antenna port may be inferred from a signal received from the other antenna port. The "large-scale properties" may include one or more of the following.

Delay spread
Doppler spread
Frequency shift
Average received power
Received Timing (2) If two antenna ports are "quasi co-located (QCL)", the UE may assume that large-scale properties of a channel over which a symbol on one antenna port is conveyed may be inferred from a channel over which a symbol on the other antenna port is conveyed). The "large-scale properties" may include one or more of the following.

Delay spread
Doppler spread
Doppler shift
Average gain
Average delay

Average angle (AA): When it is said that QCL is guaranteed between antenna ports in terms of AA, this may imply that when a signal is to be received from other antenna port(s) based on an AA estimated from specific antenna port(s), the same or similar reception beam direction (and/or reception beam width/sweeping degree) may be set and the reception is processed accordingly (in other words, that when operated in this manner, reception performance at or above a certain level is guaranteed).

Angular spread (AS): When it is said that QCL is guaranteed between antenna ports in terms of AS, this may imply that an AS estimated from one antenna port may be derived/estimated/applied from an AS estimated from another antenna port.

Power Angle(-of-Arrival) Profile (PAP): When it is said that QCL is guaranteed between antenna ports in terms of PAP, this may imply that a PAP estimated from one antenna port may be derived/estimated/applied from a PAP estimated from another antenna port (or the PAPs may be treated as similar or identical).

In the present disclosure, both of the concepts defined in (1) and (2) described above may be applied to QCL. Alternatively, the QCL concepts may be modified such that it may be assumed that signals are transmitted from a co-location, for signal transmission from antenna ports for which the QCL assumption is established (e.g., the UE may assume that the antenna ports are transmitted from the same transmission point).

In the present disclosure, partial QCL between two antenna ports may mean that at least one of the foregoing QCL parameters for one antenna port is assumed/applied/used as the same as for the other antenna port (when an associated operation is applied, performance at or above a certain level is guaranteed).

1.7. Bandwidth Part (BWP)

In the NR system to which the present disclosure is applicable, a frequency resource of up to 400 MHz may be allocated/supported for each CC. When a UE operating in such a wideband CC always operates with a radio frequency (RF) module for the entire CCs turned on, battery consumption of the UE may increase.

Alternatively, considering various use cases (e.g., enhanced mobile broadband (eMBB), ultra-reliable and low latency communication (URLLC), and massive machine type communication (mMTC), and so on) operating within a single wideband CC, a different numerology (e.g., SCS) may be supported for each frequency band within the CC.

Alternatively, the maximum bandwidth capability may be different for each UE.

In consideration of the above situation, the BS may indicate/configure the UE to operate only in a partial bandwidth instead of the entire bandwidth of the wideband CC. The partial bandwidth may be defined as a BWP.

A BWP may include consecutive RBs on the frequency axis, and one BWP may correspond to one numerology (e.g., SCS, CP length, slot/mini-slot duration, and so on).

The BS may configure a plurality of BWPs in one CC configured for the UE. For example, the BS may configure a BWP occupying a relatively small frequency region in a PDCCH monitoring slot, and schedule a PDSCH indicated by the PDCCH (or a PDSCH scheduled by the PDCCH) in a larger BWP. Alternatively, when UEs are concentrated on a specific BWP, the BS may configure another BWP for some of the UEs, for load balancing. Alternatively, the BS may exclude some spectrum of the entire bandwidth and configure both of the BWPs in the same slot in consideration of frequency-domain inter-cell interference cancellation between neighboring cells.

The BS may configure at least one DL/UL BWP for the UE associated with the wideband CC and activate at least one DL/UL BWP among the configured DL/UL BWP(s) at a specific time (through L1 signaling (e.g., DCI), MAC or RRC signaling, etc.). The activated DL/UL BWP may be called an active DL/UL BWP. The UE may fail to receive DL/UL BWP configurations from the BS during an initial access procedure or before setting up an RRC connection. A DL/UL BWP assumed by such a UE is defined as an initial active DL/UL BWP.

2. Unlicensed Band System

Figure 17A:
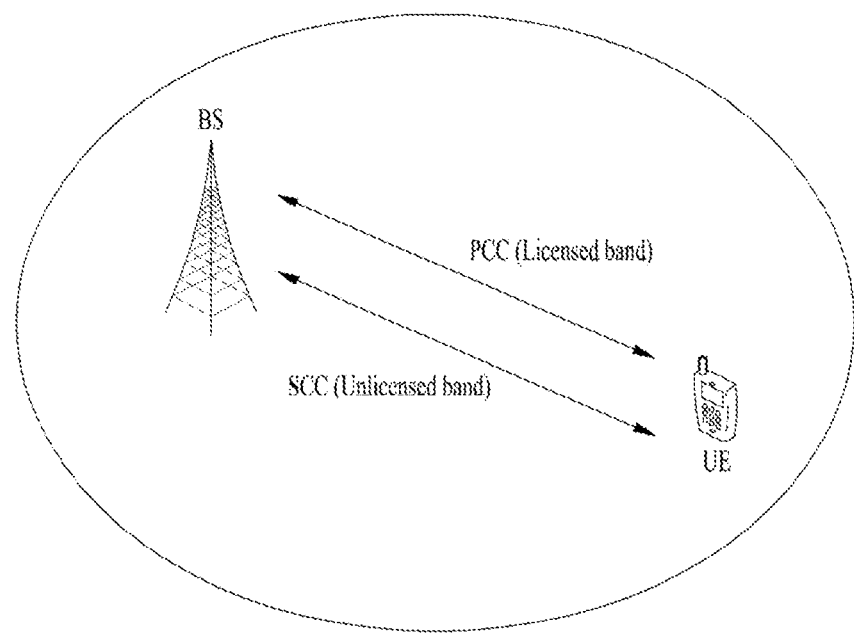
FIGS. 17A and 17B illustrate an exemplary wireless communication system supporting an unlicensed band, which is applicable to the present disclosure.
Figure 17B:
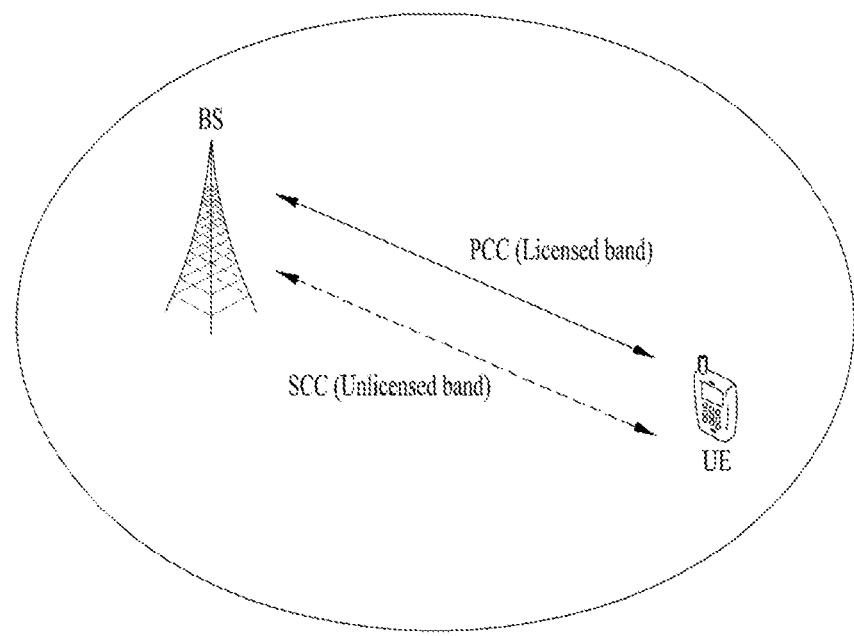

FIGS. 17A and 17B illustrate a wireless communication system supporting an unlicensed band applicable to the present disclosure.

Herein, a cell operating in a licensed band (L-band) is defined as an L-cell, and a carrier in the L-cell is defined as a (DL/UL) LCC. A cell operating in an unlicensed band (U-band) is defined as a U-cell, and a carrier in the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on an LCC and a UCC where carrier aggregation is applied as shown in FIG. 17A, the LCC and the UCC may be set to a primary CC (PCC) and a secondary CC (SCC), respectively.

The BS and UE may transmit and receive signals on one UCC or on a plurality of UCCs where the carrier aggregation is applied as shown in FIG. 17B. In other words, the BS and UE may transmit and receive signals on UCC(s) with no LCC.

Signal transmission and reception operations in U-bands, which will be described later in the present disclosure, may be applied to all of the aforementioned deployment scenarios (unless specified otherwise).

2.1. Radio Frame Structure for Unlicensed Band

For operation in U-bands, LTE frame structure type 3 (see FIG. 3) or the NR frame structure (see FIG. 7) may be used. The configuration of OFDM symbols reserved for UL/DL signal transmission in a frame structure for U-bands may be determined by a BS. In this case, the OFDM symbol may be replaced with an SC-FDM(A) symbol.

To transmit a DL signal in a U-band, the BS may inform a UE of the configuration of OFDM symbols used in subframe #n through signaling. Herein, a subframe may be replaced with a slot or a time unit (TU).

Specifically, in the LTE system supporting U-bands, the UE may assume (or recognize) the configuration of occupied OFDM symbols in subframe #n based on a specific filed in DCI (e.g., Subframe configuration for LAA' field, etc.), which is received in subframe #n−1 or subframe #n from the BS.

Table 7 shows how the Subframe configuration for LAA field indicates the configuration of OFDM symbols used to transmit DL physical channels and/or physical signals in the current or next subframe.

TABLE 7

| Value of 'Subframe configuration for LAA' field in current subframe | Configuration of occupied OFDM symbols (current subframe, next subframe) |
|---|---|
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

To transmit a UL signal in a U-band, the BS may provide information on a UL transmission interval to the UE through signaling.

Specifically, in the LTE system supporting U-bands, the UE may obtain 'UL duration' and 'UL offset' information for subframe #n from the 'UL duration and offset' field in detected DCI.

Table 8 shows how the UL duration and offset field indicates the configurations of a UL offset and a UL duration.

TABLE 8

| Value of 'UL duration and offset' field | UL offset, l (in subframes) | UL duration, d (in subframes) |
|---|---|---|
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | o | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

For example, when the UL duration and offset field configures (or indicates) a UL offset 1 and UL a duration d for subframe #n, the UE may not need to receive DL physical channels and/or physical signals in subframe #n+l+i (where i=0, 1, . . . , d−1).

2.2. Downlink Channel Access Procedures

To transmit a DL signal in a U-band, a BS may perform a channel access procedure (CAP) for the U-band as follows. In the following description, it is assumed that a BS is basically configured with a PCell corresponding to an L-band and at least one SCell, each corresponding to a U-band. The U-band may be referred to as a licensed assisted access (LAA) SCell. Hereinafter, a description will be given of DL CAP operation applicable to the present disclosure. In this case, the DL CAP operation may be equally applied when the BS is configured only with U-bands.

2.2.1. Channel Access Procedure for Transmission(s) Including PDSCH/PDCCH/EPDCCH A BS may transmit a transmission including a PDSCH/PDCCH/EPDCCH on a carrier on which LAA SCell(s) transmission(s) are performed after sensing whether the channel is idle during the slot durations of a defer duration $T_d$ and after a counter N becomes zero in step 4. In this case, the counter N is adjusted by sensing the channel for an additional slot duration according to the following steps.

1) N is set to $N_{init}$ (N=$N_{init}$), where $N_{init}$ is a random number uniformly distributed between 0 and $CW_p$. Then, step 4 proceeds.

2) If N>0 and the BS chooses to decrease the counter, N is set to N−1 (N=N−1).

3) The channel for the additional slot duration is sensed. If the additional slot duration is idle, step 4 proceeds. Otherwise, step 5 proceeds.

4) If N=0, the corresponding process is stopped. Otherwise, step 2 proceeds.

5) The channel is sensed until either a busy slot is detected within an additional defer duration $T_d$ or all the slots of the additional defer duration $T_d$ are detected to be idle.

6) If the channel is sensed to be idle during all the slot durations of the additional defer duration $T_d$, step 4 proceeds. Otherwise, step 5 proceeds.

The CAP for the transmission including the PDSCH/PDCCH/EPDCCH performed by the BS may be summarized as follows.

Figure 18:
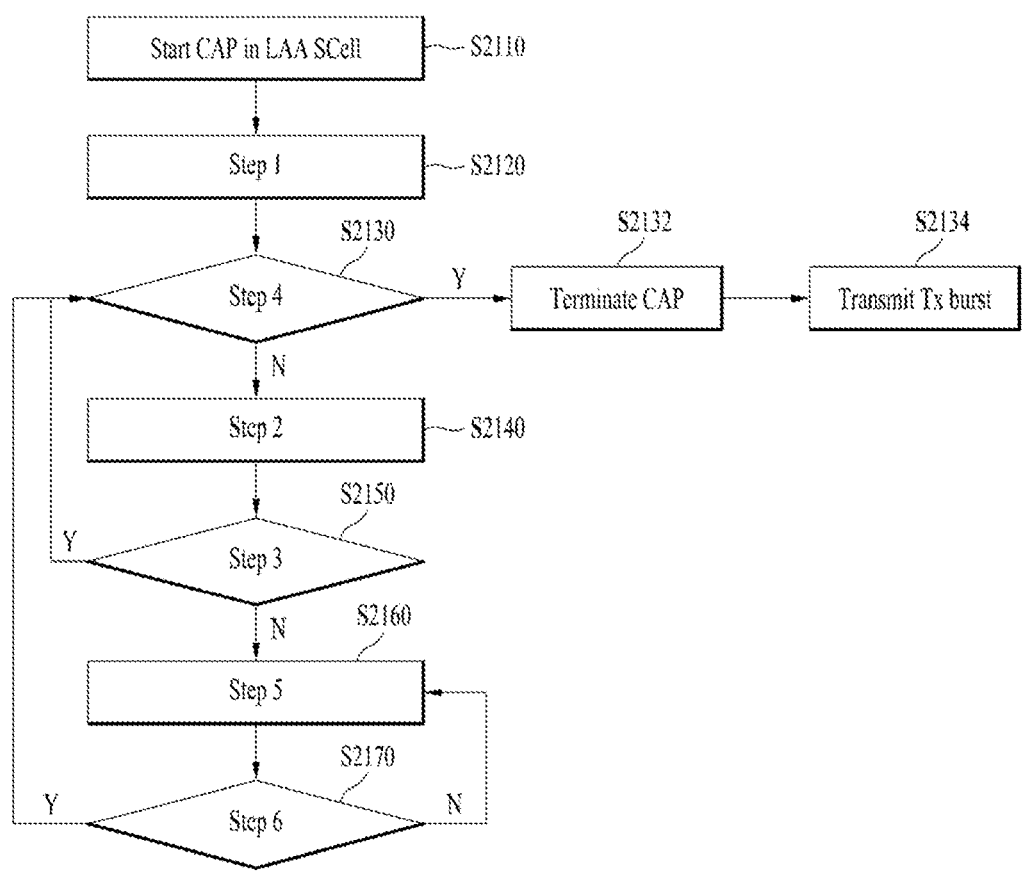
FIG. 18 is a diagram illustrating a channel access procedure (CAP) for transmission in an unlicensed band, which is applicable to the present disclosure.

FIG. 18 is a diagram for explaining a CAP for U-band transmission applicable to the present disclosure.

For DL transmission, a transmission node (e.g., BS) may initiate a CAP to operate in LAA SCell(s), each corresponding to a U-band cell (S1810).

The BS may randomly select a backoff counter N within a contention window (CW) according to step 1. In this case, N is set to an initial value, $N_{init}$ (S1820). $N_{init}$ may have a random value between 0 and $CW_p$.

If the backoff counter value (N) is 0 (YES in S1830), the BS terminates the CAP according to step 4 (S1832). Then, the BS may transmit a transmission (Tx) burst including the PDSCH/PDCCH/EPDCCH (S1834). If the backoff counter value is non-zero (NO in S1830), the BS decreases the backoff counter value by 1 according to step 2 (S1840).

The BS checks whether the channel of the LAA SCell(s) is idle (S1850). If the channel is idle (YES in S1850), the BS checks whether the backoff counter value is 0 (S1830).

If the channel is not idle in S1850, that is, if the channel is busy (NO in S1850), the BS checks whether the corresponding channel is idle during the defer duration $T_d$ (longer than or equal to 25 usec), which is longer than the slot duration (e.g., 9 usec), according to step 5 (S1860). If the channel is idle (YES in S1870), the BS may resume the CAP.

For example, when the backoff counter value N is 10, if the channel is determined to be busy after the backoff counter value is reduced to 5, the BS determines whether the channel is idle by sensing the channel during the defer duration. In this case, if the channel is idle during the defer duration, the BS performs the CAP again starting at the backoff counter value of 5 (or at 4 by decreasing the backoff counter value by 1), instead of configuring the backoff counter value $N_{init}$.

On the other hand, if the channel is busy during the defer duration (NO in S1870), the BS performs steps S1860 again to check whether the channel is idle during a new defer duration.

When the BS does not transmit the transmission including the PDSCH/PDCCH/EPDCCH on the carrier on which the LAA SCell(s) transmission(s) are performed after step 4 in the above procedure, the BS may transmit the transmission including the PDSCH/PDCCH/EPDCCH on the carrier if the following conditions are satisfied:

When the BS is ready to transmit the PDSCH/PDCCH/EPDCCH and the channel is sensed to be idle at least in a slot duration $T_{sl}$; and when the channel is sensed to be idle during all the slot durations of the defer duration $T_d$ immediately before the transmission.

If the channel is sensed not to be idle during the slot duration $T_{sl}$ when the BS senses the channel after being ready to transmit or if the channel is sensed not to be idle during any one of the slot durations of the defer duration $T_d$ immediately before the intended transmission, the BS proceeds to step 1 after sensing the channel to be idle during the slot durations of the defer duration $T_d$.

The defer duration $T_d$ includes a duration $T_f(=16\text{ us})$ immediately followed by $m_p$ consecutive slot durations. Here, each slot duration ($T_{sl}$) is 9 us long, and $T_f$ includes an idle slot duration $T_{sl}$ at the start thereof.

When the BS senses the channel during the slot duration $T_{sl}$, if the power detected by the BS for at least 4 us within the slot duration is less than an energy detection threshold $X_{Thresh}$, the slot duration $T_{sl}$ is considered to be idle. Otherwise, the slot duration $T_{sl}$ is considered to be busy.

$CW_{min,p} \leq CW_p \leq CW_{max,p}$ represents the CW. The adjustment of $CW_p$ will be described in detail in clause 2.2.3.

$CW_{min,p}$ and $CW_{max,p}$ are selected before step 1 of the above procedure.

$m_p$, $CW_{min,p}$ and $CW_p$ are determined based on channel access priority classes associated with transmissions at the BS (see Table 9 below).

The adjustment of $X_{Thresh}$ will be described in clause 2.2.4.

TABLE 9

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

When N>0 in the above procedure, if the BS transmits a discovery signal not including the PDSCH/PDCCH/EPDCCH, the BS may not decrease the counter N during slot duration(s) overlapping with the discovery signal transmission.

The BS may not continuously perform transmission on the carrier on which the LAA SCell(s) transmission(s) are performed for a period exceeding $T_{mcot,p}$ in Table 9 above.

For p=3 and p=4 in Table 9 above, if the absence of any other technologies sharing the carrier can be guaranteed on a long term basis (e.g. by level of regulation), $T_{mcot,p}$ is set to 10 ms. Otherwise, $T_{mcot,p}$ is set to 8 ms.

2.2.2. Channel Access Procedure for Transmissions Including Discovery Signal Transmission(s) and not Including PDSCH When a BS has a transmission duration less than or equal to 1 ms, the BS may performs transmission including a discovery signal but not including a PDSCH on a carrier on which LAA SCell(s) transmission(s) are performed immediately after sensing that the channel is idle at least for a sensing interval $T_{drs}$ of 25 us. $T_{drs}$ includes a duration $T_f$ (=16 us) immediately followed by one slot duration $T_{sl}$ of 9 us. $T_f$ includes an idle slot duration $T_{sl}$ at the start thereof. When the channel is sensed to be idle during the slot durations of $T_{drs}$, the channel is considered to be idle for $T_{drs}$.

2.2.3. Contention Window Adjustment Procedure

If a BS transmits transmissions including PDSCHs that are associated with the channel access priority class p on a carrier, the BS maintains the CW value $CW_p$ and adjusts $CW_p$ for the transmissions before step 1 of the procedure described in clause 2.2.1 (i.e., before performing the CAP) according to the following steps.

1> For every priority class $p \in \{1, 2, 3, 4\}$, $CW_p$ is set to $CW_{min,p}$.

2> If at least Z=80% of HARQ-ACK values corresponding to PDSCH transmission(s) in reference subframe k are determined as NACK, $CW_p$ for every priority class $p \in \{1, 2, 3, 4\}$ increases to a next higher allowed value, and step 2 remains. Otherwise, step 1 proceeds.

In other words, the probability that the HARQ-ACK values corresponding to the PDSCH transmission(s) in reference subframe k are determined as NACK is at least 80%, the BS increases the CW values configured for the individual priority classes to next higher allowed values, respectively. Alternatively, the BS may maintain the CW value configured for each priority class as an initial value.

In this case, reference subframe k is the starting subframe of the most recent transmission on the carrier made by the BS, for which at least some HARQ-ACK feedback is expected to be available.

The BS may adjust the value of $CW_p$ for every priority class $p \in \{1, 2, 3, 4\}$ based on given reference subframe k only once.

If $CW_p = CW_{max,p}$, the next higher allowed value for adjusting $CW_p$ is $CW_{max,p}$.

To determine the probability Z that the HARQ-ACK values corresponding to the PDSCH transmission(s) in reference subframe k are determined as NACK, the following may be considered.

When the BS's transmission(s) for which HARQ-ACK feedback is available start in the second slot of subframe k, HARQ-ACK values corresponding to PDSCH transmission(s) in subframe k+1 are also used in addition to the HARQ-ACK values corresponding to the PDSCH transmission(s) in subframe k.

When the HARQ-ACK values correspond to PDSCH transmission(s) on an LAA SCell that are assigned by a (E)PDCCH transmitted on the same LAA SCell, If no HARQ-ACK feedback is detected for a PDSCH transmission by the BS, or if the BS detects 'DTX' state, 'NACK/DTX' state, or 'any' state, it is counted as NACK.

When the HARQ-ACK values correspond to PDSCH transmission(s) on an LAA SCell that are assigned by a (E)PDCCH transmitted on another serving cell, If the HARQ-ACK feedback for a PDSCH transmission is detected by the BS, the 'NACK/DTX' state or the 'any' state is counted as NACK and the 'DTX' state is ignored.

If no HARQ-ACK feedback is detected for a PDSCH transmission by the BS,

If PUCCH format 1b with channel selection, which is configured by the BS, is expected to be used by the UE, the 'NACK/DTX' state corresponding to 'no transmission' is counted as NACK, and the 'DTX' state corresponding to 'no transmission' is ignored. Otherwise, the HARQ-ACK for the PDSCH transmission is ignored.

When a PDSCH transmission has two codewords, the HARQ-ACK value of each codeword is considered separately.

Bundled HARQ-ACKs across M subframes are considered as M HARQ-ACK responses.

If the BS transmits transmissions including a PDCCH/EPDCCH with DCI format 0A/0B/4A/4B and not including a PDSCH that are associated with the channel access priority class p on a channel starting from time to, the BS maintains the CW value $CW_p$ and adjusts $CW_p$ for the transmissions before step 1 of the procedure described in clause 2.2.1 (i.e., before performing the CAP) according to the following steps.

1> For every priority class $p \in \{1, 2, 3, 4\}$, $CW_p$ is set to $CW_{min, p}$.

2> If less than 10% of the UL transport blocks scheduled for the UE by the BS according to a Type 2 CAP (which will be described in clause 2.3.1.2) in a time interval from to and $t_0 + T_{CO}$ are received successfully, $CW_p$ for every priority class $p \in \{1, 2, 3, 4\}$ increases to a next higher allowed value, and step 2 remains. Otherwise, step 1 proceeds.

The calculation of $T_{CO}$ will be described in clause 2.3.1.

If $CW_p = CW_{max}$, p is consecutively used K times to generate $N_{init}$, $CW_p$ is reset to $CW_{min, p}$ only for the priority class p for which $CW_p = CW_{max, p}$ is consecutively used K times to generate $N_{init}$. In this case, K is selected by the BS from a set of values $\{1, 2, \ldots, 8\}$ for each priority class $p \in \{1, 2, 3, 4\}$.

2.2.4. Energy Detection Threshold Adaptation Procedure

A BS accessing a carrier on which LAA SCell(s) transmission(s) are performed may set an energy detection threshold ($X_{Thresh}$) to be less than or equal to a maximum energy detection threshold $X_{Thresh\_max}$.

The maximum energy detection threshold $X_{Thresh\_max}$ is determined as follows.

If the absence of any other technologies sharing the carrier can be guaranteed on a long term basis (e.g., by level of regulation), $$X_{Thesh\_max} = \min\left\{\begin{array}{l} T_{max} + 10 \text{ dB}, \\ X_r \end{array}\right\}$$

$X_r$ is a maximum energy detection threshold defined by regulatory requirements in dBm when such requirements are defined. Otherwise, $X_r = T_{max} + 10$ dB.

Otherwise, $$X_{Thres\_max} = \max\left\{\min\left\{\begin{array}{l} -72 + 10 \cdot \log10(BW\text{MHz}/20 \text{ MHz})\text{dBm}, \\ T_{max}, \\ T_{max} - T_A + (P_H + 10 \cdot \log10(BW\text{MHz}/20 \text{ MHz}) - P_{TX}) \end{array}\right\}\right\}$$

Each variable is defined as follows:

$T_A = 10$ dB for transmission(s) including PDSCH;

$T_A = 5$ dB for transmissions including discovery signal transmission(s) and not including PDSCH;

$P_H = 23$ dBm;

$P_{TX}$ is the set maximum eNB output power in (Elm for the earrilT eNB uses the set maximum transmission power over a single carrier irrespective of whether single carrier or multi-cattier transmission is employed $T_{max}$(dBm) = $10 \cdot \log 10(3.16228 \cdot 10^{-8}$ (mW/MHz) $\cdot BW\text{MHz}$ (MHz))

BWMHz is the single carrier bandwidth in MHz 2.2.5. Channel Access Procedure for Transmission(s) on Multiple Carriers A BS may access multiple carriers on which LAA Scell(s) transmission(s) are performed according to one of the following Type A or Type B procedures.

2.2.5.1. Type A Multi-Carrier Access Procedures

A BS may perform channel access on each carrier $c_i \in C$ according to the aforementioned procedures, where C is a set of carriers on which the BS intends to transmit, and i=0, 1, \ldots, q-1, where q is the number of carriers on which the BS intends to transmit.

The counter N described in clause 2.2.1 (i.e., the counter N considered in the CAP) is determined for each carrier $c_i$. The counter for each carrier is denoted as $N_{c_i}$. $N_{c_i}$ is maintained according to clause 2.2.5.1.1 or 2.2.5.1.2.

2.2.5.1.1. Type A1

The counter N described in clause 2.2.1 (i.e., the counter N considered in the CAP) is independently determined for each carrier $c_i$, and the counter for each carrier is denoted as $N_{c_i}$.

When the BS ceases transmission on any one carrier $c_j \in C$ for each carrier (where) $c_i \neq c_j$), if the absence of any other technologies sharing the carrier cannot be guaranteed on a long term basis (e.g. by level of regulation), the BS may resume decreasing $N_{c_i}$ when an idle slot is detected after waiting for a duration of $4 \cdot T_{sl}$, or after reinitializing $N_{c_i}$.

2.2.5.1.2. Type A2

The counter N may be determined as described in clause 2.2.1 for each carrier $c_j \in C$, and the counter for each carrier is denoted as $N_{c_j}$, where $c_j$ is a carrier having the largest $CW_p$ value. For each carrier $c_i$, $N_{c_i} = N_{c_j}$.

When a BS ceases transmission on any one carrier for which $N_{c_i}$ is determined, the BS reinitializes $N_{c_i}$ for all carriers.

2.2.5.2. Type B Multi-Carrier Access Procedure

A carrier $c_j \in C$ may be selected by a BS as follows.

The BS uniformly randomly selects $c_j$ from C before performing transmission on multiple carriers $c_i \in C$, or The BS selects $c_j$ no more frequently than once every 1 second.

C is a set of carriers on which the BS intends to transmit, and i=0, 1, \ldots, q-1, where q is the number of carriers on which the BS intends to transmit.

To perform transmission on the carrier $c_j$, the BS performs channel access on the carrier $c_1$ according to the procedures described in clause 2.2.1 with the following modifications, which will be described in 2.2.5.2.1 or 2.2.5.2.2.

To perform transmission on a carrier $c_i \neq c_j$ among carriers $c_i \in C$,

For each carrier $c_j$, the BS senses a carrier $c_i$ for at least a sensing interval $T_{mc}=25$ us immediately before transmission on the carrier $c_j$. Then, the BS may transmit on the carrier $c_i$ immediately after sensing the carrier $c_i$ to be idle for at least the sensing interval $T_{mc}$. The carrier $c_i$ is considered to be idle for $T_{mc}$ if the channel is sensed to be idle during all the time durations in which such sensing for determining the idle state is performed on the carrier $c_j$ in the given interval $T_{mc}$.

The BS may not continuously perform transmission on the carrier $c_i \neq c_j$ (where $c_i \in C$) for a period exceeding $T_{mcot,p}$ given in Table 6, where $T_{mcot,p}$ is determined based on channel access parameters used for the carrier $c_j$.

2.2.5.2.1. Type B1

A single $CW_p$ value is maintained for a set of carriers C.

To determine $CW_p$ for channel access on a carrier $c_j$, step 2 of the procedure described in clause 2.2.3 may be modified as follows.

If at least Z=80% of HARQ-ACK values corresponding to PDSCH transmission(s) in reference subframe k of all carriers $c_i \in C$ are determined as NACK, $CW_p$ for each priority class $p \in \{1, 2, 3, 4\}$ increases to a next higher allowed value. Otherwise, step 1 proceeds.

2.2.5.2.2. Type B2

A $CW_p$ value is maintained independently for each carrier $c_i \in C$ according to the procedure described in clause 2.2.3. To determine $N_{init}$ for a carrier $c_j$, the $CW_p$ value of a carrier $c_{j1} \in C$ is used, where $c_{j1}$ is a carrier with the largest $CW_p$ value among all carriers in the set C.

2.3. Uplink Channel Access Procedures

A UE and a BS scheduling UL transmission for the UE may perform the following procedures to access channel(s) on which LAA SCell(s) transmission(s) are performed. In the following description, it is assumed that a UE and a BS are basically configured with a PCell corresponding to an L-band and at least one SCell, each corresponding to a U-band. The U-band may be referred to as an LAA SCell. Hereinafter, a description will be given of UL CAP operation applicable to the present disclosure. In this case, the UL CAP operation may be equally applied when the UE and BS are configured only with U-bands.

2.3.1. Channel Access Procedure for Uplink Transmission(s)

A UE may access a carrier on which LAA SCell(s) UL transmission(s) are performed according to either a Type 1 UL CAP or a Type 2 UL CAP. The Type 1 CAP will be described in clause 2.3.1.1, and the Type 2 CAP will be described in clause 2.3.1.2.

If a UL grant scheduling PUSCH transmission indicates the Type 1 CAP, the UE performs the Type 1 CAP for transmitting transmissions including the PUSCH transmission unless specified otherwise in this clause.

If a UL grant scheduling PUSCH transmission indicates the Type 2 CAP, the UE performs the Type 2 CAP for transmitting transmissions including the PUSCH transmission unless specified otherwise in this clause.

The UE performs the Type 1 CAP for transmitting an SRS not including PUSCH transmission. A UL channel access priority class p=1 is used for SRS transmission including no PUSCH.

TABLE 10

| Channel Access Priority Class (p) | $m_p$ | $CW_{min,p}$ | $CW_{max,p}$ | $T_{ulm\ cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3,4, $T_{ulm\ cot,p}$ = 10 ms if the higher layer parameter absenceOfAnyOtherTechnology-r14 or absenceOfAnyOtherTechnology-r16 is provided, otherwise, $T_{ulm\ cot,p}$ = 6 ms.

NOTE 2:
When $T_{ulm\ cot,p}$ = 6 ms it may be increased to 8 ms by inserting one or more gaps. The minimum duration of a gap shall be 100 us. The maximum duration before including any such gap shall be 6 ms.

When the 'UL configuration for LAA' field configures a 'UL offset' l and a 'UL duration' d for subframe n, If the end of UE transmission occurs in or before subframe n+l+d−1, the UE may use the Type 2 CAP for transmission in subframe n+l+i (where i=0, 1, . . . , d−1).

When the UE is scheduled to perform transmission including a PUSCH in a set of subframes $n_0, n_1, \ldots, n_{w-1}$ using PDCCH DCI format 0B/4B, if the UE is incapable of accessing a channel for transmission in subframe $n_k$, the UE shall attempt to make a transmission in subframe $n_{k+1}$ according to the channel access type indicated by DCI, where $k \in \{0, 1, \ldots w-2\}$, and w is the number of scheduled subframes indicated by the DCI.

When the UE is scheduled to perform transmission including a PUSCH without gaps in a set of subframes $n_0, n_1, \ldots, n_{w-1}$ using one or more PDCCH DCI Format 0A/0B/4A/4B, if the UE performs transmission in subframe $n_k$ after accessing a carrier according to one of the Type 1 or Type 2 UL CAPs, the UE may continue transmission in subframes after $n_k$, where $k \in \{0, 1, \ldots w-1\}$.

If the start of a UE transmission in subframe n+1 immediately follows the end of a UE transmission in subframe n, the UE is not expected to be indicated with different channel access types for the transmissions in the subframes.

When the UE is scheduled to perform transmission without gaps in subframes $n_0 n_1 \ldots , n_{w-1}$ using one or more PDCCH DCI Format 0A/0B/4A/4B, if the UE stops transmitting during or before subframe $n_{k1}$ (where k1 $\in \{0, 1, \ldots w-2\}$), and if the UE senses that the channel is continuously idle after stopping the transmission, the UE may transmit after subframe $n_{k2}$ (where k2 $\in \{1, \ldots w-1\}$) using the Type 2 CAP. If the UE senses that the channel is not continuously idle after stopping the transmission, the UE may transmit after subframe $n_{k2}$ (where k2 $\in \{1, \ldots w-1\}$) using the Type 1 CAP with a UL channel access priority class indicated by DCI corresponding to subframe $n_{k2}$.

When the UE receives a UL grant, if the DCI indicates the start of PUSCH transmission in subframe n using the Type 1 CAP, and if the UE has an ongoing Type 1 CAP before subframe n, If a UL channel access priority class value $p_1$ used for the ongoing Type 1 CAP is greater than or equal to a UL channel access priority class value $p_2$ indicated by the DCI, the UE may perform the PUSCH transmission in response to the UL grant by accessing the carrier based on the ongoing Type 1 CAP.

If the UL channel access priority class value $p_1$ used for the ongoing Type 1 CAP is smaller than the UL channel access priority class value $p_2$ indicated by the DCI, the UE terminates the ongoing CAP.

When the UE is scheduled to transmit on a set of carriers C in subframe n, if UL grants scheduling PUSCH transmissions on the set of carriers C indicate the Type 1 CAP, if the same 'PUSCH starting position' is indicated for all carriers in the set of carriers C, and if the carrier frequencies of the set of carriers C are a subset of one of the predetermined carrier frequency sets, The UE may perform transmission on a carrier $c_i \in C$ using the Type 2 CAP.

If the Type 2 CAP is performed on the carrier $c_i$ immediately before the UE performs transmission on a carrier $c_j \in C$ (where $i \neq j$), and If the UE has accessed the carrier $c_j$ using the Type 1 CAP, The UE selects the carrier $c_j$ uniformly and randomly from the set of carriers C before performing the Type 1 CAP on any carrier in the set of carriers C.

When the BS has transmitted on the carrier according to the CAP described in clause 2.2.1, the BS may indicate the Type 2 CAP in DCI of a UL grant scheduling transmission including a PUSCH on a carrier in subframe n.

Alternatively, when the BS has transmitted on the carrier according to the CAP described in clause 2.2.1, the BS may indicate using the 'UL configuration for LAA' field that the UE may perform the Type 2 CAP for transmission including a PUSCH on a carrier in subframe n.

Alternatively, when subframe n occurs within a time interval that starts at to and ends at $t_0+T_{CO}$, the eNB may schedule transmission including a PUSCH on a carrier in subframe n, which follows transmission by the BS on a carrier with a duration of $T_{short\_ul}=25$ us, where $T_{CO}=T_{mcot,p}+T_g$. The other variables are defined as follows.

$t_0$: a time instant when the BS starts transmission $T_{mcot,p}$: a value determined by the BS as described in clause 2.2

$T_g$: the total duration of all gaps greater than 25 us that occur between DL transmission from the BS and UL transmission scheduled by the BS and between any two UL transmissions scheduled by the BS starting from $t_0$ The BS schedules UL transmissions between $t_0$ and $t_0+T_{CO}$ in consecutive subframes if the UL transmissions are capable of being scheduled contiguously.

For a UL transmission on a carrier that follows a transmission by the BS on the carrier within a duration of $T_{short\_ul}=25$ us, the UE may use the Type 2 CAP for the UL transmission.

If the BS indicates the Type 2 CAP for the UE in the DCI, the BS indicates the channel access priority class used to obtain access to the channel in the DCI.

2.3.1.1. Type 1 UL Channel Access Procedure

A UE may perform transmission using the Type 1 CAP after sensing a channel to be idle during the slot durations of a defer duration $T_d$ and after a counter N becomes zero in step 4. In this case, the counter N is adjusted by sensing a channel for additional slot duration(s) according to the following steps.

1) N is set to $N_{init}$ ($N=N_{init}$), where $N_{init}$ is a random number uniformly distributed between 0 and $CW_p$. Then, step 4 proceeds.

2) If N>0 and the UE chooses to decrease the counter, N is set to N−1 (N=N−1).

3) The channel for the additional slot duration is sensed. If the additional slot duration is idle, step 4 proceeds. Otherwise, step 5 proceeds.

4) If N=0, the corresponding process is stopped. Otherwise, step 2 proceeds.

5) The channel is sensed until either a busy slot is detected within an additional defer duration $T_d$ or all the slots of the additional defer duration $T_d$ are detected to be idle.

6) If the channel is sensed to be idle during all the slot durations of the additional defer duration $T_d$, step 4 proceeds. Otherwise, step 5 proceeds.

The Type 1 UL CAP performed by the UE may be summarized as follows.

For UL transmission, a transmission node (e.g., UE) may initiate a CAP to operate in LAA SCell(s), each corresponding to a U-band cell (S1810).

The UE may randomly select a backoff counter N within a CW according to step 1. In this case, N is set to an initial value, $N_{init}$ (S1820). $N_{init}$ may have a random value between 0 and $CW_p$.

If the backoff counter value (N) is 0 (YES in S1830), the UE terminates the CAP according to step 4 (S1832). Then, the UE may transmit a Tx burst (S1834). If the backoff counter value is non-zero (NO in S1830), the UE decreases the backoff counter value by 1 according to step 2 (S1840).

The UE checks whether the channel of the LAA SCell(s) is idle (S1850). If the channel is idle (YES in S1850), the UE checks whether the backoff counter value is 0 (S1830).

If the channel is not idle in S1850, that is, if the channel is busy (NO in S1850), the UE checks whether the corresponding channel is idle during the defer duration $T_d$ (longer than or equal to 25 usec), which is longer than the slot duration (e.g., 9 usec), according to step 5 (S1860). If the channel is idle (YES in S1870), the UE may resume the CAP.

For example, when the backoff counter value $N_{init}$ is 10, if the channel is determined to be busy after the backoff counter value is reduced to 5, the UE determines whether the channel is idle by sensing the channel during the defer duration. In this case, if the channel is idle during the defer duration, the UE performs the CAP again starting at the backoff counter value of 5 (or at 4 by decreasing the backoff counter value by 1), instead of configuring the backoff counter value $N_{init}$.

On the other hand, if the channel is busy during the defer duration (NO in S1870), the UE performs steps S1860 again to check whether the channel is idle during a new defer duration.

When the UE does not transmit the transmission including the PUSCH on the carrier on which the LAA SCell(s) transmission(s) are performed after step 4 in the above procedure, the UE may transmit the transmission including the PUSCH on the carrier if the following conditions are satisfied:

When the UE is ready to perform the transmission including the PUSCH and the channel is sensed to be idle at least in a slot duration $T_{sl}$; and When the channel is sensed to be idle during all the slot durations of the defer duration $T_d$ immediately before the transmission including the PUSCH.

If the channel is sensed not to be idle during the slot duration $T_{sl}$ when the UE senses the channel after being ready to transmit or if the channel is sensed not to be idle during any one of the slot durations of the defer duration $T_d$ immediately before the intended transmission including the PUSCH, the UE proceeds to step 1 after sensing the channel to be idle during the slot durations of the defer duration $T_d$.

The defer duration $T_d$ includes a duration $T_f$ (=16 us) immediately followed by $m_p$ consecutive slot durations. Here, each slot duration ($T_{sl}$) is 9 us long, and $T_f$ includes an idle slot duration $T_{sl}$ at the start thereof.

When the UE senses the channel during the slot duration $T_{sl}$, if the power detected by the UE for at least 4 us within the slot duration is less than an energy detection threshold $X_{Thresh}$, the slot duration $T_{sl}$ is considered to be idle. Otherwise, the slot duration $T_{sl}$ is considered to be busy.

$CW_{min,p} \leq CW_p \leq CW_{max,p}$ represents the CW. The adjustment of $CW_p$ will be described in detail in clause 2.3.2.

$CW_{min,p}$ and $CW_{max,p}$ are selected before step 1 of the above procedure.

$m_p$, $CW_{min,p}$, and $CW_{max,p}$ are determined based on channel access priority classes signaled to the UE (see Table 9 above).

The adjustment of $X_{Thresh}$ will be described in clause 2.3.3.

2.3.1.2. Type 2 UL Channel Access Procedure

If a UE uses the Type 2 CAP for transmission including a PUSCH, the UE may transmit the transmission including the PUSCH immediately after sensing a channel to be idle for at least a sensing interval $T_{short\_ul}$=25 us $T_{short\_ul}$ includes a duration $T_f$=16 us immediately followed by one slot duration $T_{sl}$=9 us, and $T_f$ includes an idle slot duration $T_{sl}$ at the start thereof. When the channel is sensed to be idle during the slot durations of $T_{short\_ul}$, the channel is considered to be idle for $T_{short\_ul}$.

2.3.2. Contention Window Adjustment Procedure

If a UE transmits transmissions using the Type 1 channel access procedure that are associated with the channel access priority class p on a carrier, the UE maintains the CW value $CW_p$ and adjusts $CW_p$ for the transmissions before step 1 of the procedure described in clause 2.3.1 (i.e., before performing the CAP) according to the following steps.

If the value of a new data indicator (NDI) for at least one HARQ process associated with HARQ_ID_ref is toggled, For every priority class $p \in \{1, 2, 3, 4\}$, $CW_p$ is set to $CW_{min,p}$.

Otherwise, $CW_p$ for every priority class $p \in \{1, 2, 3, 4\}$ increases to a next higher allowed value.

Here, HARQ_ID_ref refers to the ID of a HARQ process of a UL-SCH in reference subframe $n_{ref}$. Reference subframe $n_{ref}$ is determined as follows.

If the UE receives a UL grant in subframe $n_g$, subframe $n_w$ is the most recent subframe before subframe $n_g$-3 in which the UE has transmitted a UL-SCH using the Type 1 channel access procedure.

If the UE performs transmission including the UL-SCH without gaps starting from subframe no and in subframes $n_0, n_1, \ldots, n_w$, reference subframe $n_{ref}$ is subframe $n_0$.

Otherwise, reference subframe $n_{ref}$ is subframe $n_w$.

When the UE is scheduled to perform transmission including a PUSCH without gaps in a set of subframes $n_0, n_1, \ldots, n_{w-1}$ using the Type 1 channel access procedure, if the UE is unable to perform any transmission including the PUSCH in the subframe set, the UE may maintain the value of $CW_p$ for every priority class $p \in \{1, 2, 3, 4\}$ without any changes.

If the reference subframe for the last scheduled transmission is also $n_{ref}$, the UE may maintain the value of $CW_p$ for every priority class $p \in \{1, 2, 3, 4\}$ to be the same as that for the last scheduled transmission including the PUSCH using the Type 1 channel access procedure.

If $CW_p = CW_{max, p}$, the next higher allowed value for adjusting $CW_p$ is $CW_{max, p}$.

If $CW_p = CW_{max, p}$ is consecutively used K times to generate $N_{init}$, $CW_p$ is reset to $CW_{min, p}$ only for the priority class p for which $CW_p = CW_{max, p}$ is consecutively used K times to generate $N_{init}$. In this case, K is selected by the UE from a set of values $\{1, 2, \ldots, 8\}$ for each priority class $p \in \{1, 2, 3, 4\}$.

2.3.3. Energy Detection Threshold Adaptation Procedure

A UE accessing a carrier on which LAA Scell(s) transmission(s) are performed may set an energy detection threshold ($X_{Thresh}$) to be less than or equal to a maximum energy detection threshold $X_{Thresh\_max}$.

The maximum energy detection threshold $X_{Thresh\_max}$ is determined as follows.

If the UE is configured with a higher layer parameter "maxEnergyDetectionThreshold-r14', $X_{Thresh\_max}$ is set equal to a value signaled by the higher layer parameter.

Otherwise,

The UE shall determine $X'_{Thresh\_max}$ according to the procedure described in clause 2.3.3.1.

If the UE is configured with a higher layer parameter 'maxEnergyDetectionThresholdOffset-r14'

$X_{Thresh\_max}$ is set by adjusting X' Thresh_max according to an offset value signaled by the higher layer parameter.

Otherwise,

The UE sets $X_{Thresh\_max} = X'_{Thresh\_max}$.

2.3.3.1. Default Maximum Energy Detection Threshold Computation Procedure

If a higher layer parameter 'absenceOfAnyOtherTechnology-r14' indicates TRUE, $$X'_{Thesh\_max} = \min\left\{ \begin{array}{c} T_{max} + 10 \text{ dB}, \\ X_r \end{array} \right\}$$

$X_r$ is a maximum energy detection threshold defined by regulatory requirements in dBm when such requirements are defined. Otherwise, $X_r = T_{max} + 10$ dB.

Otherwise, $$X'_{Thres\_max} = \max\left\{ \min\left\{ \begin{array}{c} -72 + 10 \cdot \log 10(BW\text{MHz}/20 \text{ MHz})\text{dBm}, \\ T_{max}, \\ T_{max} - T_A + (P_H + 10 \cdot \log 10(BW\text{MHz}/20 \text{ MHz}) - P_{TX}) \end{array} \right\} \right\}$$

Each variable is defined as follows:

$T_A$=10 dB $P_H$=23 dBm, $P_{TX}$ is the set to the a hie of $P_{CMAX\_He}$ as destined m 3GPP TS:6.101.

$T_{max}$ (dBm)=10·log 10 (3.16228·10$^{-8}$ (mW/MHz)· BWMHz (MHz))

BWMHz is the single carrier bandwidth in MHz.

2.4. Subframe/Slot Structure Applicable to U-band System

Figure 19:
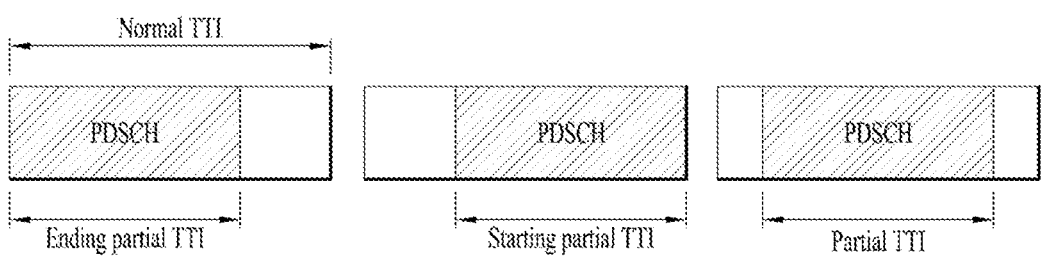
FIG. 19 is a diagram illustrating a partial transmission time interval (TTI) or a partial subframe/slot, which is applicable to the present disclosure.

FIG. 19 is a diagram illustrating a partial transmission time interval (TTI) or a partial subframe/slot applicable to the present disclosure.

In the Rel-13 LAA system, a partial TTI is defined using the DwPTS to make the best use of a maximum channel occupancy time (MCOT) during transmission of a DL Tx burst and support continuous transmission. The partial TTI (or partial subframe) refers to an interval in which a signal is transmitted in a shorter period than the legacy TTI (e.g., 1 ms) in PDSCH transmission In the present disclosure, a starting partial TTI or a starting partial subframe refers to a format in which some symbols located at the fore part of a subframe are left blank, and an ending partial TTI or an ending partial subframe refers to a format in which some symbols located at the rear part of a subframe are left blank (whereas a complete TTI is referred to as a normal TTI or a full TTI).

FIG. 19 illustrates various types of partial TTIs. In FIG. 12, the first block represents an ending partial TTI (or an ending partial subframe/slot), the second block represents a starting partial TTI (or a starting partial subframe/slot), and the third block represents a partial TTI (or a partial subframe/slot) where some symbols located at the fore and rear parts of a subframe are left blank. Here, a time interval obtained by removing a portion for signal transmission from a normal TTI is referred to as a transmission gap (Tx gap).

While FIG. 19 is based on DL operation, the present disclosure may be equally applied to UL operation. For example, the partial TTI structure shown in FIG. 19 is applicable to PUCCH and/or PUSCH transmission.

3. Proposed Embodiments

Hereinafter, the configurations according to the present disclosure will be described in detail based on the above-described technical features. The details described above in clauses 1 and 2 may be applied to the embodiments of the present disclosure. For example, operations, functions, terms, etc. not defined regarding the embodiments of the present disclosure may be executed or explained based on the details in clauses 1 and 2.

As described above, as many communication devices have required high communication capacity, the necessity for efficient use of limited frequency bands has increased in next generation wireless communication systems.

For example, a method of using unlicensed bands in traffic offloading is discussed in cellular communication systems including the LTE system and the NR system. Such an unlicensed band may be referred to as a U-band. The U-band may include the 2.4 GHz unlicensed band, which is commonly used in the conventional Wi-Fi system, and the 5/6 GHz band, which newly attracts attention.

Basically, it is assumed that each communication node competes with other communication nodes to perform wireless transmission and reception in U-bands. Thus, before transmitting a signal, each communication node needs to perform channel sensing to check whether other communication nodes perform signal transmission. This operation may be referred to as listen before talk (LBT) or a channel access procedure (CAP). In particular, an operation of checking whether other communication nodes perform signal transmission may be referred to as carrier sensing (CS). When it is determined that there is no communication node performing signal transmission, it may be said that clear channel assessment (CCA) is confirmed.

The above description is equally applied to the LTE or NR wireless communication system. Specifically, a BS or a UE in the LTE or NR wireless communication system needs to perform the CAP to transmit a signal in a U-band. In addition, when the BS or UE in the LTE or NR wireless communication system performs signal transmission, other communication nodes (e.g., Wi-Fi node, etc.) also need to perform the CAP to avoid causing interference to the BS or UE performing the signal transmission.

For example, in Wi-Fi specifications (801.11ac), a CCA threshold of −62 dBm is defined for a non-Wi-Fi signal, and a CCA threshold of −82 dBm is defined for a Wi-Fi signal. That is, when a station (STA) or an access point (AP) receives a non-Wi-Fi signal with power over −62 dBm, the STA or AP is prohibited to perform signal transmission to avoid causing interference.

In the LAA system, a carrier bandwidth is limited to 20 MHz in consideration of a Wi-Fi system coexisting in the same bands. The reason for this is that the Wi-Fi system determines whether a channel is idle or busy on a 20 MHz basis. Exceptionally, additional LAA operation in a 10 MHz bandwidth (BW) is allowed for bands where there are no coexisting Wi-Fi systems.

In the NR, an SCS larger than 15 kHz has been introduced. Thus, the maximum BW of the NR may be greater than the maximum BW of the LTE wireless communication system, 20 MHz. For example, when the SCS is 15 kHz, the carrier BW may be set to a maximum of 50 MHz. When the SCS is 30 kHz, the carrier BW may be set to a maximum of 100 MHz. As another example, when the SCS is 30 kHz, the carrier BW may be set to a maximum of 50 MHz. When the SCS is 60 kHz, the carrier BW may be set to a maximum of 100 MHz.

Depending UE capability, there may be a UE operating in a BW smaller than the maximum carrier BW managed by a network. In consideration of such a UE, a BS in the NR wireless communication system may configure for the UE a BWP smaller than a managed carrier BW.

The various embodiments of the present disclosure relate to BWP operations in U-bands. For example, the embodiments are directed to a BWP configuration and activation method in consideration of a heterogeneous RAT such as Wi-Fi, LAA, etc., a channel occupancy time (COT) sharing method between DL and UL, a method of transmitting a data and/or control channel per BWP, and the like.

For DL operation in NR-unlicensed (NR-U) bands, the following options for BWP-based operation within a carrier with a BW larger than 20 MHz may be considered.

Option 1a: Multiple BWPs are configured. Multiple BWPs are activated. A PDSCH is transmitted on one or more BWPs.

Option 1b: Multiple BWPs are configured. Multiple BWPs are activated. A PDSCH is transmitted on a single BWP.

Option 2: Multiple BWPs can be configured. A single BWP is activated. A gNB transmits a PDSCH on a single BWP if CCA is successful for the whole BWP.

Option 3: Multiple BWPs can be configured. A single BWP is activated. A gNB transmits a PDSCH on a part or the entirety of a single BWP where the gNB succeeds in CCA.

In the embodiments of the present disclosure, a UE may be configured with one of Options 1a, 1b, 2 and 3 unless specified otherwise. In particular, a UE may be configured with Option 3. However, the embodiments of the present disclosure are not limited to the aforementioned options.

Figure 20:
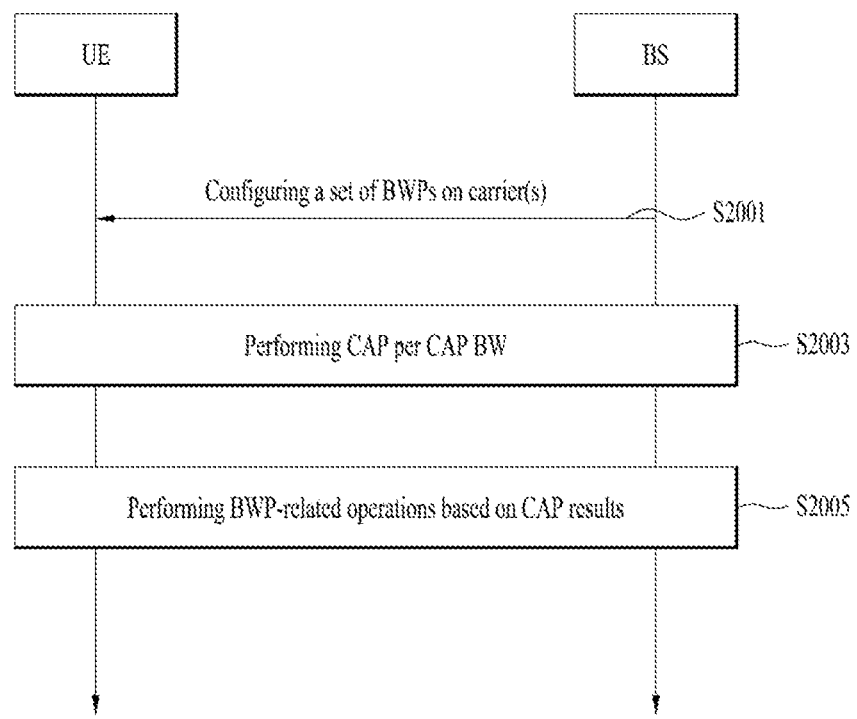
FIG. 20 is a diagram illustrating a signal transmission and reception method between a user equipment (UE) and a base station (BS) in an unlicensed band applicable to the present disclosure.

FIG. 20 is a diagram illustrating a signal transmission and reception method between a UE and a BS in a U-band applicable to the present disclosure.

Referring to FIG. 20, the BS may configure a set of BWPs on carrier(s) for the UE (S2001). In other words, the BS may configure a set of BWPs on carrier(s) and transmit information on the configured BWP set to the UE. The UE may receive the information on the BWP set from the BS. The BWP set may include at least one BWP corresponding to an active BWP for the UE.

The carrier may include a U-band or an unlicensed carrier (U-carrier). In addition, one or more BWPs may be configured on one carrier.

The BS or UE may perform a CAP for performing communication in the U-band (S2003). Here, the CAP may be performed for each CAP BW. The CAP BW refers to the minimum (frequency) unit/band of the CAP performed by the BS or UE. The CAP BW may be referred to as an LBT BW. The CAP BW may be referred to as a CAP sub-band. The CAP BW may be referred to as an LBT sub-band as well. In the present specification, such terms may be interchangeably used.

The CAP BW may be configured independently for each carrier (or carrier group) and/or BWP (or BWP group). Alternatively, the CAP BW may be configured commonly for all carriers (or carrier groups) and/or BWPs (or BWP groups).

The BS or UE may perform BWP-related operations based on CAP results (S2005).

The BWP-related operations according to the embodiments of the disclosure may include, for example, active BWP indication, DL-UL COT sharing, control/data channel generation/transmission, etc. Hereinafter, the details of each embodiment will be described.

3.1. BWP Configuration Method 3.1.1. BWP Configuration in Unit of BW Length Determined Based on Type of Coexisting Heterogeneous RAT FIG. 21 is a diagram illustrating BWPs included in a BWP configuration applicable to the present disclosure.

Figure 21:
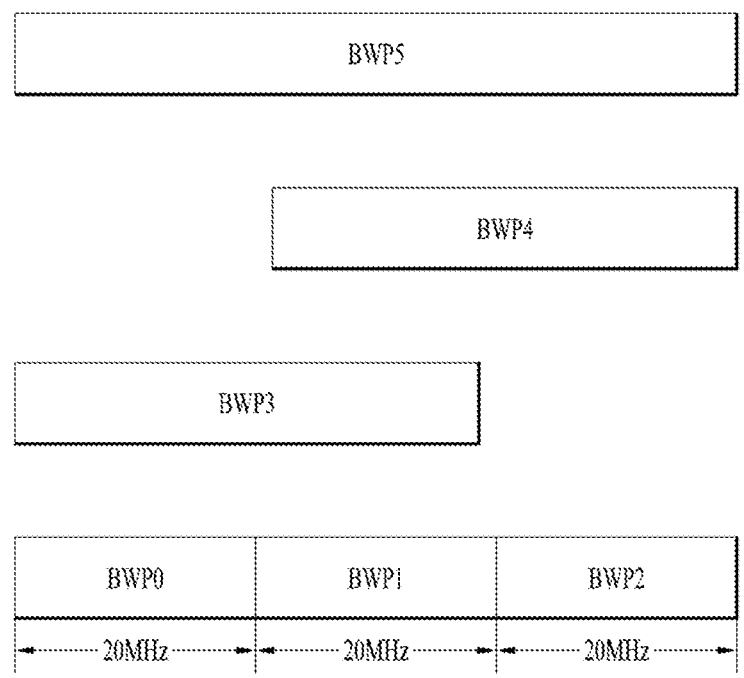
FIG. 21 is a diagram illustrating bandwidth parts (BWPs) included in a BWP configuration applicable to the present disclosure.

In FIG. 21, it is assumed that a BS manages a continuous carrier BW of 60 MHz. For example, a BWP configuration configurable by the BS for a UE may include three BWPs each having a 20 MHz BW (BWPs 0/1/2), two BWPs each having a 40 MHz BW (BWPs 3/4), and one BWP having a 60 MHz BW (BWP 5). The BS may configure some or all of the BWPs for the UE.

Although the minimum length of the BWP is assumed to be 20 MHz in the present disclosure, the present disclosure is not limited thereto. The minimum length of the BWP may vary depending on implementation. For example, the minimum length of the BWP may depend on the type of a coexisting RAT. That is, when the BS configures the BWP, the BS may limit the minimum BWP unit to have a predetermined BW length by considering a heterogeneous RAT. This limitation may be applied not only to the present embodiment but also to other embodiments of the present disclosure, which will be described later. It will be understood by those skilled in the art.

When the BS is allowed to configure the BWP in a unit of 40 MHz, if a 20 MHz BW included in the corresponding BWP is occupied by Wi-Fi, it may be erroneously determined that the entirety of a 40 MHz BWP is occupied by Wi-Fi. This is because the Wi-Fi/LAA system determines whether a channel is idle or busy on a 20 MHz basis as described above. Therefore, the BS in a wireless communication system coexisting with the Wi-Fi/LAA system may limit the minimum BWP unit to 20 MHz.

The BS may configure the BWP over consecutive frequency bands. As described above, it is assumed in FIG. 21 that the BS manages the continuous 60 MHz carrier BW. In this case, the BS may allocate the UE some or all of the 6 BWPs: three BWPs each having the 20 MHz BW; two BWPs each having the 40 MHz BW; and one BWP having the 60 MHz BW.

A DL BWP and a UL BWP may be paired with each other. In this pairing, PUCCH transmission after PDSCH reception, PUSCH transmission after a UL grant, or reporting after measuring CSI/RRM (radio resource measurement) may be considered.

For example, the same BWPs may be paired as the DL BWP and the UL BWP. Referring to FIG. 21, when BWP 0 is set to the DL BWP, the UL BWP paired with the DL BWP may also be BWP 0.

As another example, when the DL BWP is greater than 20 MHz, at least one UL BWP equal to or included in the DL BWP may be paired with the DL BWP.

Referring again to FIG. 21, when BWP 3 is set to the DL BWP, the UL BWP paired with the DL BWP may correspond to at least one BWP included in BWP 3, i.e., BWP 0, BWP 1, and/or BWP 3. In particular, the pairing according to the present disclosure is advantageous in terms of COT sharing between the BS and UE, which will be described in clause 3.3.

In the present disclosure, the CAP BW may refer to the minimum unit of the CAP performed by the BS or UE as described above. Each of BWPs 0, 1, and 2 illustrated in FIG. 21 may correspond to the CAP BW.

In the present specification, when the BS or UE succeeds in the CAP for BWP 0, BWP 1, and/or BWP 2 and transmits a DL/UL signal for BWP 0, BWP 1, and/or BWP 2 for which the CAP is successful, it may be interpreted to mean that the operation described in 1) or 2) is performed.

1) The DL/UL signal for configured or activated BWP 0, BWP 1, and/or BWP 2 is transmitted.
2) Even if BWP 0, BWP 1, and/or BWP 2 is not configured or activated, the DL/UL signal is transmitted for a BW corresponding to BWP 0, BWP 1, and/or BWP 2. Specifically, it is assumed BWP 3, BWP 4, and/or BWP 5 is configured or activated. Referring again to FIG. 21, each of BWPs 3, 4, and 5 includes BWP 0, BWP 1, and/or BWP 2. In this example, when the BS or UE succeeds in the CAP for BWP 0, BWP 1, and/or BWP 2 and transmits a DL/UL signal for BWP 0, BWP 1, and/or BWP 2 for which the CAP is successful, it may mean that the transmitted DL/UL signal is for BWP 0, BWP 1, and/or BWP 2 respectively included in configured or activated BWP 3, BWP 4, and/or BWP 5 rather than for configured or activated BWP 3, BWP 4, and/or BWP 5.

3.1.2. BWP Configuration in Unit Different from BW Unit for Performing CAP

This embodiment is directed to operation from the perspective of a BS or a UE. In particular, the operation from the perspective of the BS will be described in the present embodiment.

The BS may configure a CAP BW with a predetermined unit but configure a BWP independently of the CAP BW. The predetermined unit for the CAP BW may be determined in consideration of a coexisting heterogeneous RAT. For example, the BS in a wireless communication system coexisting with the Wi-Fi/LAA system may configure a CAP on a 20 MHz basis. The BWP may be configured independently of the CAP BW as described above. This is because the BWP may be configured UE-specifically.

It is assumed that when a 10 MHz BWP is configured or activated, a 5 MHz BW in the 10 MHz BWP belongs to one CAP BW, and the remaining 5 MHz BW belongs to another CAP BW. In this case, the BS and/or UE may transmit data in the corresponding BWP only when succeeding in the CAP for the two CAP BWs. As a result, the transmission probability may decrease.

To solve such a problem, when the BW of a configured and/or activated BWP is less than the CAP BW, the corresponding BWP may be confined to one CAP BW. This may be generalized as follows: when a configured and/or activated BWP is B MHz, the corresponding BWP may be confined in a BWP including ceiling {B/20} BWs, each corresponding to 20 MHz. Here, ceiling 0 is a ceiling function for calculating a minimum integer greater than or equal to a certain real number. In the present embodiment, the CAP BW may be replaced with the minimum BWP unit and/or 20 MHz.

Considering occupied BWs and regulations such as power spectral density, etc., the UL BWP may also be configured in a predetermined unit. For example, the UL BWP may also be configured on a 20 MHz basis.

When the DL BWP is less than 20 MHz, the UL BWP paired with the DL BWP may include the corresponding DL BWP.

For example, referring again to FIG. 21, when the DL BWP is a BWP having a 5 MHz BW in BWP 0, the UL BWP paired with the DL BWP may be BWP 0.

When the DL BWP is greater than 20 MHz, the UL BWP paired with the DL BWP may be minimum BWPs, each of which corresponds to 20 MHz, including the corresponding DL BWP and/or some of the BWPs.

For example, referring again to FIG. 21, when a DL BWP of 30 MHz consists of BWP 0 of 10 MHz and BWP 1 of 20 MHz, a UL BWP paired with the DL BWP may be BWP 0, BWP 1, and/or BWP 3.

In the present disclosure, the minimum unit (i.e., the minimum length of a BWP, the minimum unit of a CAP BW, etc.) may be determined based on the numerology of a wireless communication network. In the above-described embodiment, 20 MHz may vary depending on the numerology of the wireless communication network. For example, considering that the numerology of the NR system is determined by $15*2^n$, it may not be a multiple/divisor of 20 MHz.

Accordingly, 20 MHz in the above-described embodiment may be replaced with, for example, a value closest to 20 MHz among values represented by $15*2^{(n*M)}$ (where n and M are natural numbers).

Alternatively, 20 MHz in the above-described embodiment may be replaced with a value closest to and less than 20 MHz among values represented by $15*2^{(n*M)}$ (where n and M are natural numbers).

Alternatively, 20 MHz in the above-described embodiment may be replaced with a value closest to and greater than 20 MHz among values represented by $15*2^{(n*M)}$ (where n and M are natural numbers).

Further, 20 MHz in the above-described embodiment may be replaced with the basic BW of a coexisting RAT. For example, when the basic BW of the coexisting RAT is not 20 MHz (e.g., when the basic BW is 10 MHz, 2 GHz, etc.), 20 MHz may be replaced with the basic BW of the corresponding coexisting RAT for implementation of the embodiments.

3.2. Active BWP Indication Method

As described above, a BS and/or a UE may perform a CAP for each BWP or each CAP BW. Considering this operation of the BS and/or UE, an actually activated BWP may vary depending on CAP results.

Currently, in the NR wireless communication system, a BS may inform a UE of an activated (or active) BWP in DCI in the case of PDSCH transmission.

However, considering a case in which a BWP for transmitting a measurement reference signal (RS) needs to be provided to an unscheduled UE or a case in which an activated BWP for PDCCH monitoring needs to be provided, a method for a BS to inform a UE of an active BWP dynamically is required.

3.2.1. Method of Using Initial Signal

A BS may inform a UE of an active BWP through an initial signal. The UE may perform blind detection for the initial signal. The UE may obtain the active BWP from the initial signal detected by the blind detection. For example, the initial signal may include a CSI-RS, a DM-RS for a PDCCH, a group-common PDCCH, a PSS, an SSS, a PBCH-DMRS, etc.

For example, referring again to FIG. 21, an initial signal may be transmitted for each of BWPs 0, 1, and 2. When the UE is configured with BWP 3, if BWPs 0 and 1 are simultaneously activated or if initial signals for both BWPs 0 and 1 are detected, the UE may know that BWP 3 is activated.

As another example, an initial signal may be configured for each of BWPs 0, 1, 2, 3, 4, and 5. Upon receiving individual initial signals, the UE may know that BWP(s) corresponding to the individual initial signals are activated.

As a further example, an initial signal transmitted for each of BWPs 0, 1, and 2 may include information on an active BWP. That is, when detecting the initial signal for BWP 0, the UE may know from information included in the detected initial signal whether an actually activated BWP is BWP 0, BWP 3, or BWP 5.

The transmission power per RE of the BS may vary depending on the actually activated BW (BWP). In this case, CSI/RRM measurement may be performed for each Tx bust with the same transmission power. Alternatively, the CSI/RRM measurement may be performed for Tx bursts with the same active BWP.

For example, referring back to FIG. 21, it is assumed that BWP 0 is activated for Tx burst 1 and BWP 3 is activated for Tx burst 2. In this case, the CSI and/or RRM measurement may be performed separately for each Tx burst. The CSI and/or RRM measurement may not be based on the average of values measured for all Tx bursts. In addition, when the UE reports the measurement to the BS, the UE may report the measurement for each active BWP instead of reporting the average.

Meanwhile, the CSI measurement may be divided into estimation for channel terms and estimation for interference terms. The estimation for channel terms may refer to estimation based on the signal strength from a serving cell, and the estimation for interference terms may mean estimation based on the signal strength of all interference signals including noise.

In the CSI measurement, if multiple CAP BWs are present in one active BWP, the interference terms may be estimated only from a Tx burst transmitted from a serving BS. In this case, the interference terms may be estimated separately for each CAP BW or CAP BW group. Here, the CAP BW or CAP BW group may imply a unit for estimating the interference terms. The CAP BW or CAP BW group may be predefined or configured/indicated by RRC signaling or L1 signaling.

3.3. DL-UL COT Sharing Method

Figures 22A, 22B:
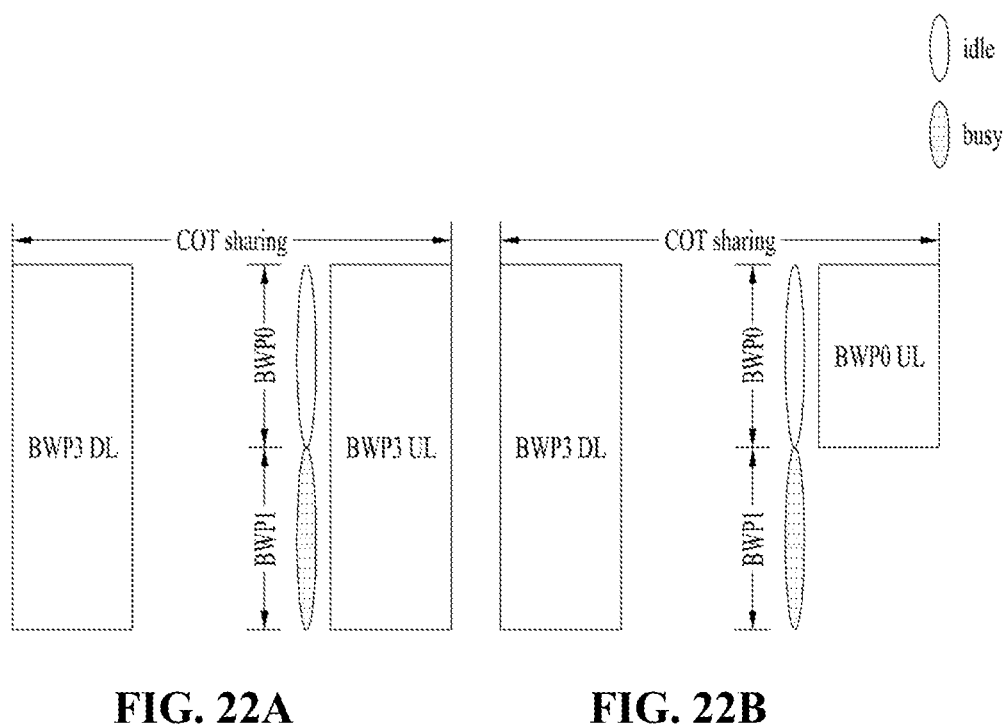
FIGS. 22A and 22B are diagrams illustrating channel occupancy time (COT) sharing between downlink (DL) and uplink (UL) BWPs applicable to the present disclosure.
Figure 23:
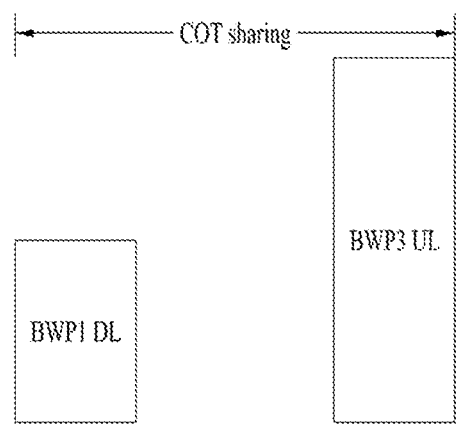
FIG. 23 is a diagram illustrating COT sharing between DL and UL BWPs applicable to the present disclosure.

FIGS. 22A to 23 are diagrams illustrating examples of COT sharing between DL and UL BWPs applicable to the present disclosure. Hereinafter, a description will be given of a DL-UL COT sharing method with reference to FIGS. 22A to 23.

In this embodiment, COT sharing may mean that one device shares its occupied COT with another device. For example, when one device obtains a COT using CAT4 LBT (CAP), another device may share the COT using 25 us LBT (CAP) with a predetermined gap in a range that does not exceed the MCOT limit for a given priority class.

In describing the embodiments of the present disclosure, related terms are defined as follows.

CAP Type 1 (Type 1 CAP): Random backoff based CAP, Category 4 CAP (CAT 4 CAP/LBT)

CAP Type 2 (Type 2 CAP): CAP performed for predetermined time (short time, for example, for 25 usec)

CAP Type 3 (Type 3 CAP): CAP where transmission starts without performing CAP

In enhanced-licensed assisted access (eLAA) of LTE Rel-14, when a BS obtains a COT by performing the Type 1 CAP and shares a part of the COT with associated UEs, the UEs may be allowed to transmit UL signals after performing the Type 2 CAP. In this case, since a channel occupied by the BS is shared with the UEs, the UEs may access to the channel with high probability.

In further enhanced-licensed assisted access (FeLAA) of NR Rel-15, it is discussed that a UE initiates occupying a COT and share the occupied COT with a BS. Further, it may also be considered that the BS and/or UE occupies a channel for an eNB-initiated COT or a UE-initiated COT.

This embodiment relates to BWP operations in the above COT sharing situation. For convenience of description, the embodiment is described based on the eNB-initiated COT, the embodiment is not limited thereto. That is, the embodiment is applicable to the UE-initiated COT as well.

In addition, the BS described in the present embodiment is not limited to an eNB. That is, the BS may be replaced with a gNB, etc. Further, the Type 2 CAP may be replaced with the Type 3 CAP in the following embodiments.

3.3.1. Signal Transmission and Reception Method in DL-UL COT Sharing

COT sharing may be allowed between a DL BWP and a UL BWP paired therewith or between a DL BWP and a UL BWP smaller than or equal to the DL BWP. Here, the pairing between the DL BWP and UL BWP may be performed according the method described in clause 3.1. In this embodiment, a BWP may be replaced with a BW corresponding to the BWP. That is, a DL BWP may be replaced with a BW corresponding to the DL BWP, and a UL BWP may be replaced with a BW corresponding to the UL BWP.

For example, the COT sharing shown in FIG. 22A is assumed. When a UE is scheduled with a PUSCH for BWP 3 (BWP 3 PUSCH), if the UE succeeds in the Type 2 CAP in both BWPs 0 and 1, the UE may transmit the PUSCH in BWP 3. In the present embodiment, the UE scheduled with the BWP 3 PUSCH may be interpreted to mean a UE scheduled with a PUSCH in a BW corresponding to BWP 3.

As another example, the COT sharing showing in FIG. 22B is assumed. When a UE is scheduled with a BWP 3 PUSCH, if the UE succeeds in the Type 2 CAP only in BWP 0, the UE may transmit the PUSCH only in BWP 0. In the present embodiment, BWP 0 may be replaced with a CAP BW corresponding to BWP 0.

In this case, a PUSCH to be transmitted in BWP 1 may be punctured or rate-matched under consideration of UE processing complexity. The UE may inform a BS that the PUSCH is punctured or rate-matched. Specifically, the UE may inform the BS that the PUSCH to be transmitted in BWP 1 is punctured or rate-matched. To this end, for example, an initial signal or a DM-RS may be used. In other words, the UE may use the initial signal or the DM-RS to inform the BS that the PUSCH to be transmitted in BWP 1 is punctured or rate-matched.

For a channel or a signal where stable transmission is important, a signal to be transmitted may be prepared for each configured BWP, and the prepared signal may be transmitted based on CAP results. Here, the channel or signal where stable transmission is important may include a PUCCH, a PRACH, an SRS, a PDCCH, etc.

For example, assuming that a UE transmits a PUCCH, the UE may separately prepare for a PUCCH for BWP 0 (BWP 0 PUCCH) and a PUCCH for BWP 1 (BWP 1 PUCCH). After performing the CAP, the UE may transmit the PUCCH for a BWP for which the CAP is successful.

When the UE succeeds in the CAP for multiple CAP BWs, the UE may transmit the PUCCH according to a predetermined method or rule.

For example, the UE may transmit a predetermined BWP PUCCH with a high priority. Alternatively, the UE may randomly select at least one BWP from among BWPs for which the CAP is successful and transmit the PUCCH in the selected BWP or BW. Further, the UE may transmit PUCCHs for all BWPs for which the CAP is successful. In the present embodiment, a BWP may be replaced with a BW corresponding to the BWP.

That is, when the UE succeeds in the CAP for both BWPs 0 and 1 in the above example, the UE may transmit either the BWP 0 PUCCH or the BWP 1 PUCCH according to predetermined priorities. Alternatively, the UE may randomly select one of BWP 0 and BWP 1 and transmit a PUCCH in the selected BWP. Further, the UE may transmit PUCCHs for both BWP 0 and BWP 1.

When the present embodiment is applied to the UE-initiated COT, the PUSCH may be replaced with the PDSCH. In addition, when the present embodiment is applied to the UE-initiated COT, the Type 2 CAP may be replaced with the Type 1 CAP. That is, when the UE succeeds in the Type 1 CAP, the present embodiment may be applied to UL transmissions to be transmitted.

In this case, the same COT may or may not be shared for DL transmission(s) after the UL transmissions.

3.3.1.1. Resource Configuration for CAP BW

In the case of a channel or a signal where stable transmission is important, signal transmission may be prepared for each BWP or CAP BW as described above. In addition, a BWP (or a CAP BW) in which transmission is actually performed may vary depending on CAP results. As described above, the channel or signal where stable transmission is important may include, for example, a PUCCH, a PRACH, an SRS, a PDCCH, etc.

This embodiment may be applied to both an eNB-initiated COT and a UE-initiated COT. Although the present embodiment is described based on a PUCCH, it is apparent that the embodiment is also applicable to a PRACH or an SRS.

When one or more CAP BWs are included in a configured or active BWP, whether a channel is idle or busy may vary for each CAP BW.

Thus, if transmission is allowed in some CAP BWs, one PUCCH resource may be configured to correspond to the one or more CAP BWs. Multiple candidates may be configured/indicated for one or more starting positions with respect to time-domain resources in the same way as those for frequency-domain resources. That is, one PUCCH resource may correspond to a 2-dimensional resource in the time and frequency domains. In the present disclosure, a plurality of PUCCH resources may be preconfigured.

Among the plurality of PUCCH resources, an actually used PUCCH resource may be indicated. For example, the plurality of PUCCH resources may be preconfigured by RRC signaling, and the actually used PUCCH resource among the plurality of PUCCH resources may be determined by UCI payload, L1 signaling, and/or PDCCH resource information.

For example, referring again to FIG. 21, one of the PUCCH resources configured for BWP 3 may correspond to a set of the following resources.

1) Starting symbol #A in a specific slot and specific RB(s) in BWP 0 (i.e., a CAP BW included in BWP 3). Here, the slot index of the specific slot may be indicated by DL assignment or common DCI.
2) Starting symbol #B in a specific slot (or a specific starting symbol in a slot after a slot including a resource corresponding starting symbol #A) and specific RB(s) in BWP 0 (i.e., a CAP BW included in BWP 3). Here, the slot index of the specific slot may be indicated by DL assignment or common DCI.
3) Starting symbol #B in a specific slot (or a specific starting symbol in a slot after a slot including a resource corresponding starting symbol #A) and specific RB(s) in BWP 1 (i.e., a CAP BW included in BWP 3). Here, the slot index of the specific slot may be indicated by DL assignment or common DCI.

In other words, in the 2-dimensional (2-D) PUCCH resource configuration, at least one starting position may be configured in the time domain with respect to a specific CAP BW. In addition, regardless of the specific CAP BW, a PUCCH resource may be configured for at least one CAP BW in the frequency domain with respect to a specific time-domain starting position.

The number of CAP BWs corresponding to one PUCCH resource may be inversely proportional to the number of time-domain starting position candidates. The reason for this is to maintain the amount of allocated resources to be similar for each PUCCH resource.

That is, when there are a relatively large number of CAP BWs corresponding to one PUCCH resource, the PUCCH resource may be configured such that there are a relatively small number of time-domain starting position candidates.

On the contrary, when there are a relatively small number of CAP BWs corresponding to one PUCCH resource, the PUCCH resource may be configured such that there are a relatively large number of time-domain starting position candidates.

It is assumed that for a specific starting position, multiple CAP BWs are configured to correspond to a PUCCH resource. In this case, if the CAP for one or more CAP BWs is successful, CAP BW(s) to be actually used for transmission may be determined according to at least one of the following standards or any combination thereof.
1) A CAP BW in which the highest (or lowest) Tx power is configured/indicated/calculated
2) A CAP BW in which the highest (or lowest) CCA threshold is configured/indicated/calculated
3) A CAP BW with the highest (or lowest) energy level
4) A CAP BW in which {CCA threshold—measured energy level} has the highest (or lowest) value
5) A CAP BW with the highest priority when there is a predetermined/preconfigured priority rule
6) A CAP BW in which a specific type of CAP is performed, i.e., a CAP BW in which the Type 1 CAP, the Type 2 CAP, or the Type 3 CAP is performed
7) All CAP BW(s) where the CAP is successful 3.3.2. Signal Transmission Method in DL-UL COT Sharing When a BWP for prescheduled UL transmission within an eNB-initiated COT is larger than a DL BWP, a UE may perform the scheduled UL transmission if the Type 1 CAP is successful. However, if the UE succeeds in the Type 2 CAP for the UL BWP rather than the Type 1 CAP, the scheduled UL transmission may be allowed in a BWP (or a BW corresponding to the BWP) smaller than the UL BWP. In this embodiment, a BWP may be replaced with a BW corresponding to the BWP.

For example, in FIG. 23, it is assumed that from the perspective of a UE scheduled with a UL BWP, a COT shared from a DL BWP includes the UL duration scheduled for the UE. That is, it is assumed that from the perspective of a UE scheduled with UL BWP 3, a COT shared from DL BWP 1 includes the UL duration scheduled for the UE. In the present embodiment, a BWP may be replaced with a BW corresponding to the BWP.

In this situation, if the UE succeeds in the Type 2 CAP for BWP 1, the UE may be allowed to transmit a PUSCH in BWP 1 by puncturing or rate-matching BWP 0. In the present embodiment, a BWP may be replaced with a BW corresponding to the BWP. That is, BWP 0 may be replaced with a BW corresponding to BWP 0, and BWP 1 may be replaced with a BW corresponding to BWP 1.

The UE may inform a BS that PUSCH puncturing or rate-matching is performed. For example, the UE may inform the BS that a PUSCH is punctured or rate-matched through the initial signal or DM-RS of the PUSCH.

When the present embodiment is applied to a UE-initiated COT, the PUSCH may be replaced with the PDSCH. In addition, when the present embodiment is applied to the UE-initiated COT, the Type 2 CAP may be replaced with the Type 1 CAP. That is, the present embodiment may be applied to UL transmissions transmitted by a UE after success of the Type 1 CAP. In this case, the same COT may or may not be shared for DL transmission(s) after the UL transmissions.

3.4. Method for Control/Data Channel Configuration for Each BWP

This embodiment relates to a method of configuring a control channel such as a PDCCH/PUCCH and/or a data channel such as a PDSCH/PUSCH. That is, the present embodiment is directed to a method of configuring a control channel for transmitting a control signal and/or a data channel for transmitting a data signal.

In particular, the present embodiment relates to a control and/or data channel configuration method suitable when a control and/or data channel is scheduled in a frequency region greater than a CAP BW. In the present embodiment, a signal may be mapped to a frequency region with a BW greater than the CAP BW. The frequency region with the BW greater than the CAP BW may be, for example, an active BWP, but the present disclosure is not limited thereto.

As described above, the CAP BW refers to a unit in which a UE and/or a BS performs a CAP. Thus, the UE and/or BS may perform the CAP on a CAP BW basis in the frequency region with the BW greater than the CAP BW. The frequency region with the BW greater than the CAP BW may be, for example, an active BWP.

Even when a data channel is scheduled in the frequency region greater than the CAP BW, data channel transmission may be allowed in some CAP BWs based on CAP results per CAP BW.

In this case, whether the transmission is allowed may be configured and/or indicated in advance. Specifically, whether the data channel transmission is allowed in some CAP BWs for which the CAP is successful may be configured and/or indicated in advance. Such a configuration and/or indication may be provided by RRC signaling, MAC CE signaling, and/or L1 signaling and/or any combination thereof.

When it is not configured/indicated, data transmission may be allowed only if the CAP is successful for all CAP BWs included in the scheduled data channel.

3.4.1. Control Channel Configuration Method

In this embodiment, a PDCCH is taken as an example of a control channel.

Time/frequency resource(s) for transmitting the PDCCH may be configured in each CAP BW (or per minimum BWP unit). In contrast, a CAP BW (or a minimum BWP unit or a BWP) may be configured for each configured time/frequency resource. The time/frequency resource(s) for transmitting the PDCCH may be referred to a control resource set (CORESET).

3.4.2. Data Channel Configuration Method

In this embodiment, a PDSCH/PUSCH is taken as an example of a data channel.

Option 1: The transmission (or transport) block of the PDSCH/PUSCH may be configured for each CAP BW. In the present embodiment, a transmission block may be replaced with a code block, a code block group, etc. In the present embodiment, a CAP BW may be replaced with the minimum BWP unit.

When mapping the PDSCH/PUSCH to resources, a BS may perform frequency-first mapping. In this case, the BS may perform the frequency-first mapping in one CAP BW and then perform the frequency-first mapping in another CAP BW. In the present embodiment, a CAP BW may be replaced with the minimum BWP unit.

According to such a data mapping method, since the PDSCH/PUSCH may be mapped to multiple CAP BWs or minimum BWP units, success in some code blocks/code block groups (CBGs) may be guaranteed even though some BWPs are not transmitted (i.e., the BWPs are punctured) due to CAP failure, thereby supporting efficient retransmission. In this case, a CBG-based retransmission scheme may be used.

Further, when a CAP time (T1) is behind a predetermined PDSCH/PUSCH start time (T2) such as a slot boundary (i.e., T1>T2), puncturing may be performed for at least a time period of T1-T2. Accordingly, a data mapping method needs to be designed in consideration of such puncturing.

For example, referring again to FIG. 21, the data channel may be configured such that the PDSCH/PUSCH is transmitted in BWP 0 and BWP 1 and in 14 symbols of slot #n. In this case, grouping may be performed on the 14 symbol at intervals of N symbols, where N is a natural number. For example, assuming that N=2, data may be mapped to resources in the following order: symbol 0/1 of BWP 0→symbol 0/1 of BWP 1→symbol 2/3 of BWP 0→ . . . symbol 2/3 of BWP 1→ . . . .

Such mapping may be generalized as follows. When the data channel is configured such that the PDSCH/PUSCH is transmitted, the data channel may be sequentially mapped to BWPs on a symbol group basis.

According to the proposed method, data loss caused by puncturing in the time/frequency domain due to the CAP failure may be effectively restored. In this case, the CBG-based retransmission scheme may be used.

Option 2: To transmit the data channel, one transmission block (TB) may be configured in each BWP with a different redundancy version (RV). By doing so, even though some BWPs are not transmitted (i.e., the BWPs are punctured) due to CAP failure, it may be restored.

Here, transmission per BWP may refer to transmission per CAP BW. For example, a different RV may be configured for each CAP BW included in an active BWP. In the present embodiment, a CAP BW may be replaced with the minimum BWP unit.

Different RVs may have different RV indices. For example, referring again to FIG. 21, when TBs are transmitted in BWP 0 and BWP 1, a TB with RV=0 and a TB with RV=3 (or 2) may be transmitted in BWP 0 and BWP 1, respectively.

Each RV index may be determined according to a predetermined method. For example, the RV index may be determined by scheduling DCI or configured by a BWP (or CAP BW) index function.

Option 3: When some (or all) BWPs are not transmitted (i.e., the BWPs are punctured) due to CAP failure, data on the non-transmitted BWPs may be transmitted in next slot(s). In the present disclosure, a BWP may be replaced with a CAP BW.

For example, referring again to FIG. 21, it is assumed that a specific TB is mapped to BWP 0/1/2 of slot #n. When a BS and/or a UE succeeds in the CAP only for BWP 0, the BS and/or UE may transmit only data mapped to BWP 0 of slot #n. The BS and/or UE may transmit data mapped to BWP 1 of slot #n in slot #n+1 and then transmit data mapped to BWP 2 of slot #n in slot #n+2.

This may be generalized as follows. When a BWP is determined to be busy by the CAP, the BS and/or UE may defer transmission of data mapped to the busy BWP (through puncturing). Specifically, the BS and/or UE may transmit the data mapped to the BWP, which is determined to be busy by the CAP, in a certain time duration. Thereafter, the BS and/or UE may transmit the rest of the data of which the transmission is deferred in a next time duration. Here, a time duration may include at least one slot. In the present embodiment, a BWP may be replaced with a CAP BW.

3.4.3. DM-RS Transmission Method

When a CAP time (T1) is behind a predetermined PDSCH/PUSCH start time (T2) such as a slot boundary (i.e., T1>T2), puncturing may be performed for at least a time period of T1-T2. Accordingly, a data mapping method needs to be designed in consideration of such puncturing.

In an embodiment, the location of a DM-RS symbol may be determined as the last symbol in the total data duration. Here, the last symbol may be represented as symbol #Z. Symbol #Z may correspond to the limit of demodulation performance and puncturing loss. When a DM-RS is capable of being transmitted in symbol #Z, the DM-RS may be transmitted by puncturing the time period of T1-T2. However, if T1 is behind symbol #Z, all data in a corresponding slot may be dropped.

In another embodiment, the location of a DM-RS symbol may be shifted according to the time at which the CAP succeeds. For example, referring again to FIG. 21, when a data channel is configured such that the data channel is transmitted in BWP 0 and BWP 1 and in 14 symbols of slot #n, the time at which a DM-RS is transmitted may vary depending on starting symbols.

For example, the DM-RS symbol may be located as follows.

When the starting symbol is within symbols 0 to 3, the DM-RS is transmitted in symbol 3.

When the starting symbol is within symbols 4 to 6, the DM-RS is transmitted in symbol 6.

When the starting symbol is within symbols 7 to 10, the DM-RS is transmitted in symbol 10.

When the starting symbol is within symbols 11 to 13, the DM-RS is transmitted in symbol 13.

3.4.4. HARQ-ACK Bundling

It is assumed that a UE and/or a BS performs CB(G)-level HARQ-ACK bundling for TB(s) transmitted in multiple CAP BWs (or minimum BWP units). In this case, the UE and/or BS may preferentially bundle HARQ-ACKs corresponding to CB(G)(s) transmitted in the same CAP BW.

For example, referring back to FIG. 21, it is assumed that TBs transmitted in BWP 3 includes CBG 0/1/2/3, CBG 0/1 belongs to BWP 0, and CBG 2/3 belongs to BWP 1.

In this case, the UE may perform bundling for each BWP. That is, when the UE reduce the size of a HARQ-ACK per CBG from 4 bits to 2 bits by performing HARQ-ACK bundling for the TBs, the UE may perform bundling as follows: (1-bit HARQ-ACK for CBG 0/1)+(1-bit HARQ-ACK for CBG 2/3).

3.4.5. Active BWP Change

As described above, an active BWP may be changed depending on the success or failure of a CAP. If data transmission needs to be performed immediately after the change of the active BWP, the implementation of a transmission node such as a BS, a UE, etc. may be more complicated.

To solve such a problem, a BS and/or a UE may transmit data in each CAP BW (or each minimum BWP unit) during K slot(s) (or X usec, i.e., SCS independent time) after succeeding in the CAP.

For example, referring back to FIG. 21, even when the CAP is successful for BWP 3, data transmission in BWP 3 may start after data is transmitted during K slots (or X usec) in each of BWPs 0 and 1.

In this case, the BS may transmit information on BWPs for which the CAP is successful to the UE. For example, the BS may transmit common DCI or DL/UL scheduling DCI to the UE by including the information on the BWPs for which the CAP is successful therein. In the present embodiment, a BWP or a CAP BW for which the CAP is successful may be replaced with a BWP or a CAP BW in which the BS intends to transmit a signal.

Here, the information on the corresponding BWPs or CAP BWs may include information about a slot in which the DCI is transmitted, next N slot(s), and/or slots in a DL/UL Tx burst.

For example, referring again to FIG. 21, it is assumed that the BS attempts DL transmission during slot #n to slot #n+4 after succeeding in the CAP for BWP 0. Here, the DL transmission may be shared with UL transmission.

The BS may inform the UE in common DCI or DL/UL scheduling DCI that data will be transmitted in BWP 0 during slot #n to slot #n+4. The UE may recognize the CB/CBG/RV of a data channel transmitted in BWP 0 according to the embodiment described in clause 3.4.2.

The present embodiment may be applied not only to the frame structure described in clause 3.4.2 but also to other normal frame structures.

Although the present embodiment is described based on the operation from the perspective of the BS, the embodiment is also applicable to UE operation. When the present embodiment is applied to the UE, information on BWPs for which the CAP is successful may be transmitted from the UE to the BS. Such information may be transmitted, for example, in a configured UL grant. When the present embodiment is applied to the UE, a BWP or a CAP BW for which the CAP is successful may be replaced with a BWP or a CAP BW in which the UE intends to transmit a signal.

3.5. Multi-BWP/Carrier CAP

In the LTE wireless communication system, when a CAP is performed for multiple carriers in LAA UL, a contention window size may be managed/executed for each carrier.

For example, when the Type 1 CAP is indicated and the same PUSCH starting position is configured for carriers, the Type 1 CAP may be performed for each carrier.

As another example, the Type 1 CAP may be indicated, and one carrier may be selected from among carriers with the same PUSCH starting position. In this case, the Type 1 CAP may be performed only for the selected carrier, and the Type 2 CAP may be performed for the remaining carriers before the success of the Type 1 CAP for the selected carrier.

This embodiment relates to a CAP method in a multi-BWP/carrier environment when a carrier BW is set greater than the typical carrier BW of the LTE LAA system, 20 MHz. Although a UL case is considered in the present embodiment, it is apparent that the present embodiment is applicable to both UL and DL.

3.5.1. CWS Adjustment and CAP on Multiple Carriers

When a BWP or a carrier is configured to have a BW greater than a CAP BW, the value of a CWS may be adjusted according to one of the following methods.

The following methods are classified according to which unit is used to adjust the CWS value. Which one of the following methods is applied, that is, which unit is used to adjust the CWS value (per BW) may be predefined or determined by specific signaling. The specific signaling may include RRC signaling, MAC CE signaling, and/or L1 signaling and/or any combination thereof Method 1: CWS adjustment for each CAP BW Method 2: CWS adjustment for each configured or active BWP For example, when transmission failure is recognized for at least one CAP BW with respect to data transmitted in a configured or active BWP, the CWS value may increase.

Alternatively, while the CWS is adjusted for each CAP BW in the configured or active BWP, the actual CWS value may be the maximum value among CWS values corresponding to CAP BWs included in the configured or active BWP.

Method 3: CWS adjustment for each carrier

In this case, the CWS value may be maintained even if switching between BWPs is performed on a carrier.

The following options may be considered when a UE scheduled with multi-carrier transmission performs a CAP. In particular, the following options may be considered when the Type 1 CAP is indicated and the same PUSCH starting position is configured for carriers.

Option A: Without distinguishing between carriers and/or BWPs, the UE may (randomly) select one specific CAP BW (i.e., a representative CAP BW) from among assigned CAP BWs. The UE may perform the Type 1 CAP only for the selected representative CAP BW. The UE may perform the Type 2 CAP for the remaining CAP BWs before the success of the Type 1 CAP for the representative CAP BW. The UE may initiate simultaneous transmission in CAP BWs that are determined to be idle. In this case, regarding the CAP BWs where the simultaneous transmission is to be initiated, transmission may be allowed only on a specific carrier when the CAP is successful for at least all CAP BWs in the corresponding carrier.

For example, it is assumed that for carrier #1, UL data transmission in one BWP, BWP #A including CAP BW #a/b is indicated and for carrier #2, UL data transmission in one BWP, BWP #C including CAP BW #c/d is indicated.

The UE may (randomly) select one CAP BW, CAP BW #c in carrier #2. CAP BW #c corresponds to the aforementioned representative CAP BW. The UE may perform the Type 1 CAP only for selected CAP BW #c and perform the Type 2 CAP for the remaining CAP BWs.

If CAP BW #a/c/d is determined to be idle when the Type 1 CAP succeeds, the UE may not initiate signal transmission in BWP #A since CAP BW #b included in BWP #A is busy. Since CAP BW #c/d included in BWP #B is all idle, the UE may initiate transmission in BWP #B. In other words, the UE may perform UL transmission in BWP #B.

Option A may be suitable for the CWS adjustment described in Method 1.

Option B: The UE may (randomly) select one specific CAP BW (i.e., a representative CAP BW) from among assigned CAP BWs only within a carrier and/or a BWP. The UE may perform the Type 1 CAP only for the representative CAP BW. The UE may perform the Type 2 CAP for the remaining CAP BWs before the success of the Type 1 CAP for the representative CAP BW and then initiate simultaneous transmission in CAP BWs determined to be idle.

Option B may be suitable for the CWS adjustment described in Method 2 and/or 3.

In the NR system, URLLC data may be preempted over eMBB data. Accordingly, a method by which a BS informs a UE of the region of the eMBB data that is not transmitted due to the preemption of the URLLC data has been introduced in the NR system.

Specifically, a preemption indicator (PI) provided by group-common DCI and a flush indicator (FI) provided by a specific field in UE-specific DCI have been introduced in the NR system.

Particularly, the PI may indicate resource regions in which transmission is performed and not performed through bit-map information obtained by dividing the frequency and time domains with specific granularity. The BS may need to inform the UE whether data transmission is actually performed or not due to the success or failure of the CAP on a U-band.

When the BS indicates whether the data transmission is actually performed or not due to the success or failure of the CAP on the U-band through the group-common DCI or UE-specific DCI, the (minimum) frequency-domain granularity may correspond to the CAP BW. Specifically, whether the data transmission is performed for each CAP BW may be indicated by the group-common DCI or UE-specific DCI. In the present embodiment, a CAP BW may be replaced with the minimum BWP unit.

Figure 24A:
FIGS. 24A and 24B are diagrams illustrating BWP(s) applicable to the present disclosure.
Figure 24B:
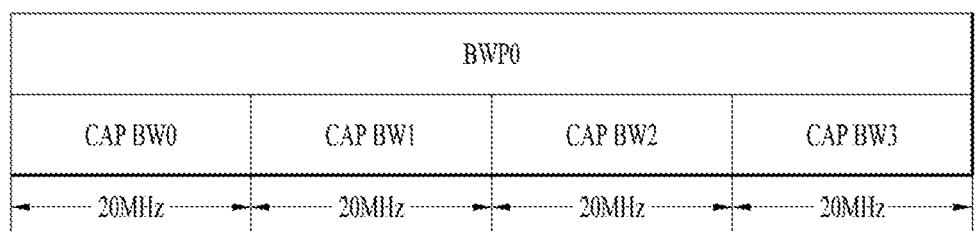

FIGS. 24A and 24B are diagrams illustrating BWP(s) applicable to the present disclosure.

Referring to FIGS. 24A and 24B, the following two options may be allowed.

Opt 1: Data is simultaneously transmitted in a plurality of active BWPs.

Opt 2: Data is simultaneously transmitted in CAP BWs for which a CAP is successful within one active BWP including multiple CAP BWs.

In Both Opt 1 and Opt 2, data transmission may be allowed only in continuous frequency bands.

Hereinafter, Opt 1 will be described in detail. When activation of a plurality of BWPs among four BWPs is allowed, data transmission may be allowed only for BWPs which are continuous in the frequency domain among BWPs for which the CAP is successful.

For example, referring to FIG. 24A, when the CAP for BWPs 0, 1, and 3 succeeds at the same time, data transmission may not be allowed for all BWPs 0, 1, and 3. The reason for this is that since BWPs 0, 1, and 3 are not continuous in the frequency domain, additional requirements such as an RF filter for BWP 2 where no data is transmitted may be required.

Thus, the data transmission may be allowed for either BWP 0/1 or BWP 3, each of which is continuous. In this case, the BWP in which data is to be transmitted may be selected according to a predetermined standard. The predetermined standard may be a predefined or configured rule.

For example, the data transmission may be performed in BWPs 0 and 1 including more frequency-domain resources. Alternatively, the data transmission may be performed in (continuous) BWPs including a specific BWP index.

The specific BWP index may include, for example, a higher index, a lower index, a specific configured index, a BWP index in which the random backoff based CAP is performed, a BWP index having the highest or lowest CWS value at present, an edge BWP index over the entire band of a CC or a BWP, etc. When the specific BWP index is the highest index, the data transmission may be performed in BWP 3.

Hereinafter, Opt 2 will be described in detail. When one active BWP includes multiple CAP BWs, data transmission may be allowed only for CAP BWs which are continuous in the frequency domain among CAP BWs for which the CAP is successful.

For example, referring to FIG. 24B, when the CAP for CAP BWs 0, 1, and 3 succeeds at the same time, data transmission may not be allowed for all CAP BWs 0, 1, and 3. The reason for this is that since CAP BWs 0, 1, and 3 are not continuous in the frequency domain, additional requirements such as an RF filter for CAP BW 2 where no data is transmitted may be required.

Thus, the data transmission may be allowed for either CAP BW 0/1 or CAP BW 3, each of which is continuous. In this case, the CAP BW in which data is to be transmitted may be selected according to a predetermined standard. The predetermined standard may be a predefined or configured rule.

For example, the data transmission may be performed in CAP BWs 0 and 1 including more frequency-domain resources. Alternatively, the data transmission may be performed in (continuous) CAP BWs including a specific CAP BW index. The specific CAP BW index may include, for example, a higher index, a lower index, a specific configured index, a CAP BW index in which the random backoff based CAP is performed, a CAP BW index having the highest or lowest CWS value at present, an edge CAP BW index over the entire band of a CC or a BWP, etc. When the specific CAP BW index is the highest index, the data transmission may be performed in CAP BW 3.

The present embodiment may be applied to both DL signal transmission at the BS and UL signal transmission at the UE. In Opt 1 and Opt 2, the BWP may be replaced with a frequency resource region for a scheduled PDSCH or PUSCH. Alternatively, in Opt 1 and Opt 2, the BWP may be replaced with a CAP BW(s) resource region for a scheduled PDSCH or PUSCH.

In Opt 1 and Opt 2, the BWP may be replaced with frequency resources in a shared COT. The frequency resources in the shared COT refers to a frequency resource region occupied when a DL burst starts in a DL-initiated COT or a frequency resource region occupied when a UL burst starts in a UL-initiated COT.

The present embodiment may be allowed only for the UE (or some UEs) except the BS. That is, transmission in discontinuous frequency bands (on one carrier) may be allowed for the BS (and/or some UEs (with relevant capability)), but the transmission in the discontinuous frequency bands (on one carrier) may not be allowed for the UE (and/or some UEs (with no relevant capability)).

The capability of the UE may be directed to the following options.

Opt 1: Association with (intra-band) UL carrier aggregation (CA) capability

For example, when reporting 2-CC UL CA capability to the BS, the UE may perform the CAP with a (digital) filter in every at least two CAP sub-bands. If a BWP of 40 MHz is activated for the UE, the corresponding UE may perform UL transmission (and DL reception) for every two CAP sub-bands in the active BWP.

Assuming that in a BWP of 80 MHz, two CAP sub-bands are defined as group A and two other CAP sub-bands are defined as group B, the BS may configure these CAP sub-band groups for the UE. The two CAP sub-bands in each group may be continuous.

When the 80 MHz BWP is activated for the UE, the UE may perform UL transmission and/or DL reception in the CAP sub-bands of one group or the CAP sub-bands of the two groups depending on CAP results per CAP sub-band even though the UE is scheduled to transmit in both group A and group B.

If the corresponding UE is configured with 2-CC CA and the 40 MHz BWP is activated for each CC, the UL transmission and/or DL reception may be performed only when the CAP is successful for all CAP sub-bands for each BWP.

Opt 2: The UE reports the number of available CAP sub-bands or the number of frequency fragments to the BS.

Here, the available CAP sub-band or frequency fragment may exist for each carrier/BWP (or in a band of 5/6 GHz).

This option may not be related to the UL CA capability of the UE. A report according to Opt 1 and/or Opt 2 may be provided through capability signaling.

For example, when the UE is capable of managing two CAP sub-bands, the UE may perform the CAP with a (digital) filter in every at least two CAP sub-bands.

The UE may report the UE capability of managing two CAP sub-bands to the BS. When a BWP of 40 MHz is activated for the UE, the UE may assume that the UE is capable of performing UL transmission (and DL reception) in every two CAP sub-bands in the active BWP.

Assuming that in a BWP of 80 MHz, two CAP sub-bands are defined as group A and two other CAP sub-bands are defined as group B, the BS may configure these CAP sub-band groups for the UE. The two CAP sub-bands in each group may be continuous.

When the 80 MHz BWP is activated for the UE, the UE may perform UL transmission and/or DL reception in the CAP sub-bands of one group or the CAP sub-bands of the two groups depending on CAP results per CAP sub-band even though the UE is scheduled to transmit in both group A and group B.

If the corresponding UE is configured with 2-CC CA and the 40 MHz BWP is activated for each CC, the UL transmission and/or DL reception may be performed only when the CAP is successful for all CAP sub-bands for each BWP.

As described above, the present disclosure relates to a method for a UE/BS to transmit a signal in a wireless communication system supporting U-bands. Such a UE/BS may be referred to as a transmission node.

Figure 25:
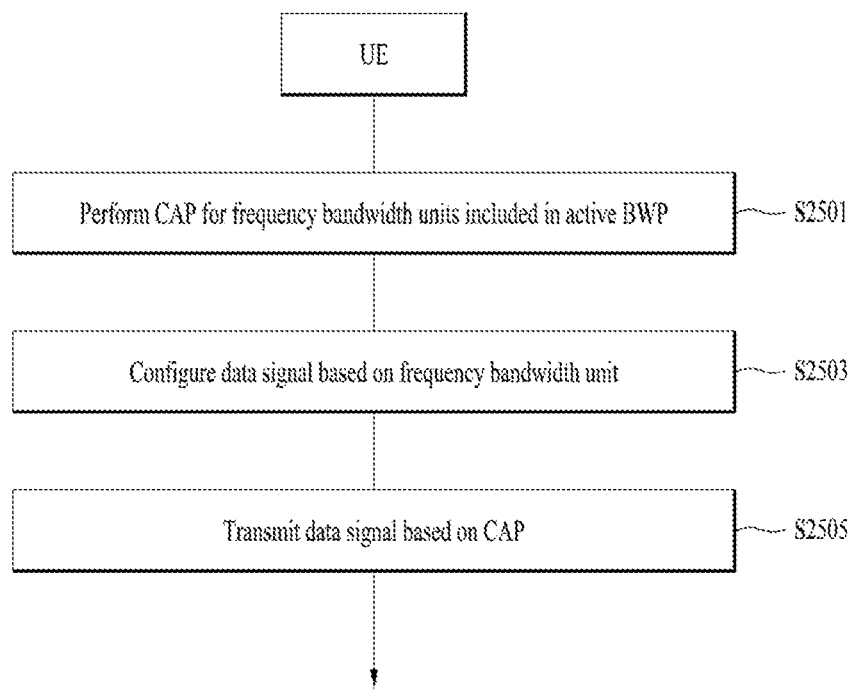
FIG. 25 is a flowchart illustrating a UE operation method in an unlicensed band applicable to the present disclosure.

FIG. 25 is a flowchart illustrating a UE operation method in a U-band applicable to the present disclosure.

Referring to FIG. 25, a UE may perform a CAP for a plurality of frequency BW units included in an active BWP (S2501). The active BWP may have a frequency BW greater than a frequency BW unit. The frequency BW unit may be equivalent to the aforementioned CAP BW or the BW corresponding thereto.

The UE may configure a data signal based on a frequency BW greater than a single frequency BW unit (S2503). That is, the data signal may be mapped to a frequency resource with a BW greater than the CAP BW. For example, the frequency resource to which the data signal is mapped may have a BW greater than 20 MHz. In addition, the frequency BW greater than the single frequency BW unit may be equivalent to the active BWP or the BW corresponding thereto.

The data signal may be configured according to a frequency-first mapping method. Specifically, the data signal may be mapped in the frequency BW greater than the single frequency BW unit according to the frequency-first mapping method. The data signal may include a plurality of blocks defined based on a plurality of frequency intervals and at least one time interval. Frequency-first mapping may be performed on a block basis. Here, the time interval may correspond to a slot, and the block may correspond to a slot group including at least one slot.

The UE may transmit the configured data signal in the U-band (S2505). In this case, the UE may transmit the data signal based on the CAP. Specifically, the UE may transmit the data signal in at least one frequency BW unit determined to be idle by the CAP. In addition, the UE may defer transmission of (a part of) the data signal mapped to at least one frequency BW unit determined to be busy by the CAP (through puncturing). In this case, the UE may transmit information on the at least one frequency BW unit determined to be busy. The deferred data signal may be transmitted in at least one slot after a slot in which the data signal is transmitted in the at least one frequency BW unit determined to be idle.

The data signal may include a TB with a different RV for each of the plurality of frequency BW units. Different RVs may have different RV indices. An RV index may be determined by scheduling DCI. Alternatively, the RV index may be determined by a function related to the plurality of frequency BW units.

The UE may transmit a DM-RS based on the CAP. In this case, the transmission start time of the DM-RS may be determined based on the start time of the CAP and the transmission start time of the data signal. Alternatively, the transmission start time of the DM-RS may be determined by shifting the location of a symbol to which the DM-RS is mapped based on the CAP.

Figure 26:
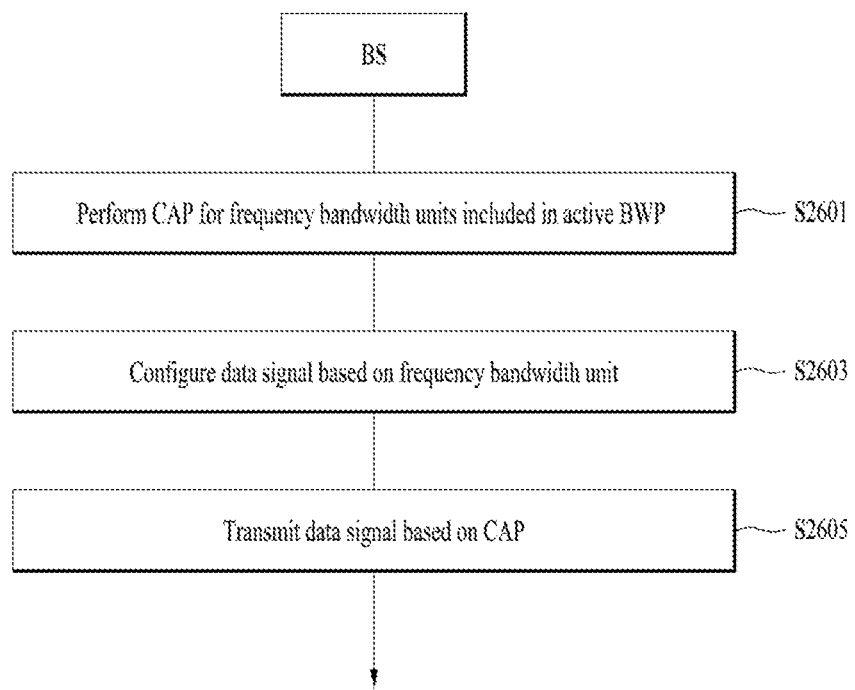
FIG. 26 is a flowchart illustrating a BS operation method in an unlicensed band applicable to the present disclosure.

FIG. 26 is a flowchart illustrating a BS operation method in a U-band applicable to the present disclosure.

Referring to FIG. 26, a BS may perform a CAP for a plurality of frequency BW units included in an active BWP (S2601). The active BWP may have a frequency BW greater than a frequency BW unit. The frequency BW unit may be equivalent to the aforementioned CAP BW or the BW corresponding thereto.

The BS may configure a data signal based on a frequency BW greater than a single frequency BW unit (S2603). That is, the data signal may be mapped to a frequency resource with a BW greater than the CAP BW. For example, the frequency resource to which the data signal is mapped may have a BW greater than 20 MHz. In addition, the frequency BW greater than the single frequency BW unit may be equivalent to the active BWP or the BW corresponding thereto.

The data signal may be configured according to a frequency-first mapping method. Specifically, the data signal may be mapped in the frequency BW greater than the single frequency BW unit according to the frequency-first mapping method. The data signal may include a plurality of blocks defined based on a plurality of frequency intervals and at least one time interval. Frequency-first mapping may be performed on a block basis. Here, the time interval may correspond to a slot, and the block may correspond to a slot group including at least one slot.

The BS may transmit the configured data signal in the U-band (S2605). In this case, the BS may transmit the data signal based on the CAP. Specifically, the BS may transmit the data signal in at least one frequency BW unit determined to be idle by the CAP. In addition, the BS may defer transmission of (a part of) the data signal mapped to at least one frequency BW unit determined to be busy by the CAP (through puncturing). In this case, the BS may transmit information on the at least one frequency BW unit determined to be busy. The deferred data signal may be transmitted in at least one slot after a slot in which the data signal is transmitted in the at least one frequency BW unit determined to be idle.

The data signal may include a TB with a different RV for each of the plurality of frequency BW units. Different RVs may have different RV indices. An RV index may be determined by scheduling DCI. Alternatively, the RV index may be determined by a function related to the plurality of frequency BW units.

The BS may transmit a DM-RS based on the CAP. In this case, the transmission start time of the DM-RS may be determined based on the start time of the CAP and the transmission start time of the data signal. Alternatively, the transmission start time of the DM-RS may be determined by shifting the location of a symbol to which the DM-RS is mapped based on the CAP.

Since examples of the above-described proposal method may also be included in one of implementation methods of the present disclosure, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Device Configuration

Figure 27:
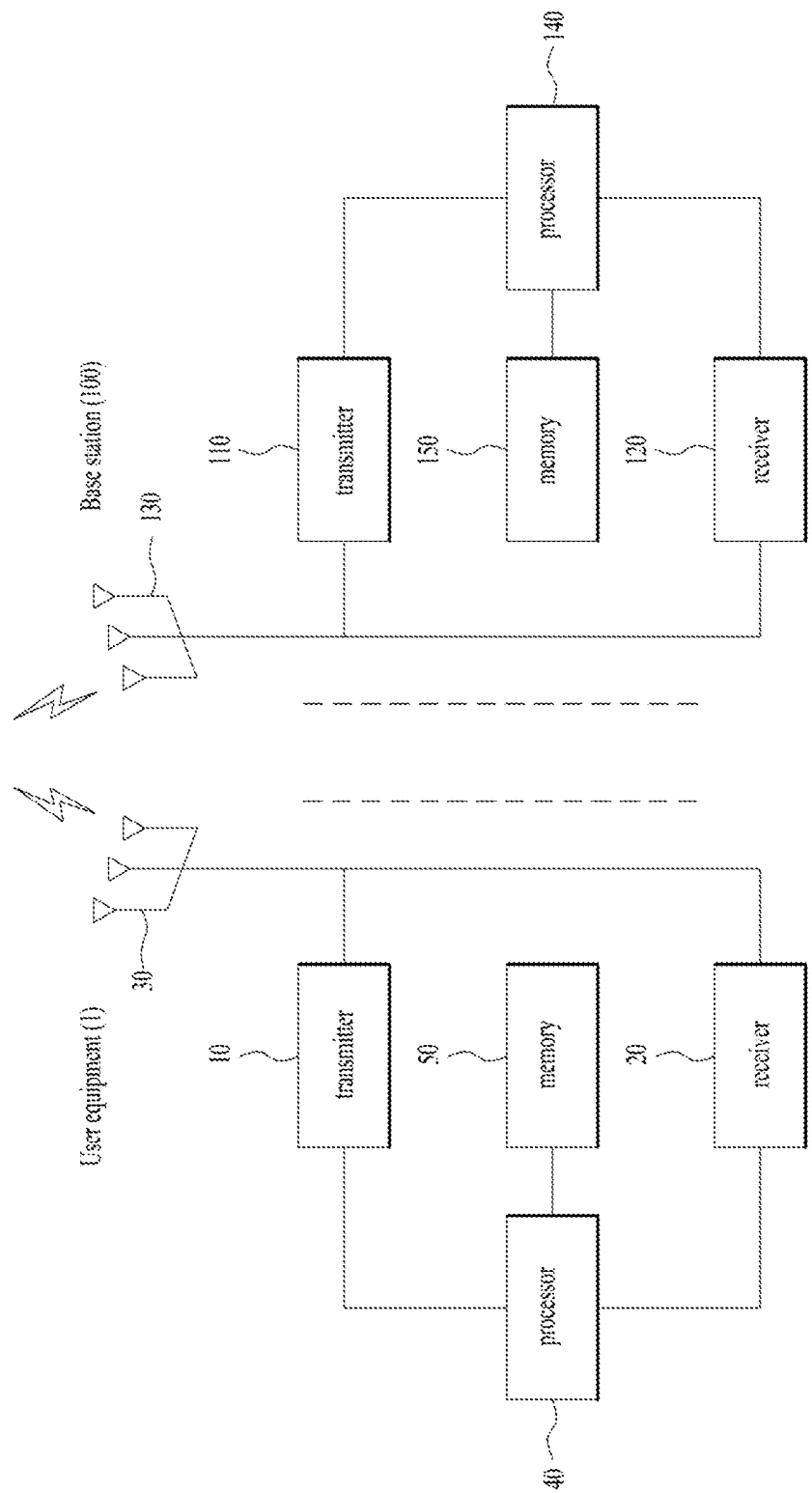
FIG. 27 is a block diagram illustrating the configurations of a UE and a BS for implementing the proposed embodiments.

FIG. 27 is a block diagram illustrating the configurations of a UE and a BS for implementing the proposed embodiments. The UE and the BS illustrated in FIG. 27 operate to implement the embodiments of the afore-described method of transmitting and receiving a signal in an unlicensed band.

A UE 1 may act as a transmission end on a UL and as a reception end on a DL. A BS (eNB or gNB) 100 may act as a reception end on a UL and as a transmission end on a DL.

That is, each of the UE and the BS may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Further, each of the UE and the BS includes a processor 40 or 140 for implementing the afore-described embodiments of the present disclosure. The processor 40 or 140 may be configured to perform the foregoing described/proposed procedures and/or methods by controlling the memory 50 or 150 and/or the Tx 10 or 110 and/or the Rx 20 or 120.

For example, the processor 40 or 140 includes a communication modem designed to implement wireless communication technologies (e.g., LTE and NR). The memory 50 or 150 is coupled to the processor 40 or 140, and stores various types of information related to operations of the processor 40 or 140. For example, the memory 50 or 150 may store software code including instructions for performing all or part of processes controlled by the processor 40 or 140 or the afore-described/proposed procedures and/or methods. The Tx 10 or 110 and/or the Rx 20 or 120 is coupled to the processor 40 or 140 and transmits and/or receives a wireless signal. The processor 40 or 140 and the memory 50 or 150 may be part of a processing chip (e.g., system on chip (SoC)).

A processor of a communication device for performing BWP operations according to the present disclosure may operate as follows by controlling a Tx, an Rx, and/or a memory.

The processor may be configured to transmit and received information on a set of BWPs configured on carrier(s). For example, the processor of the BS may be configured to configure for the UE a BWP set on carrier(s) and transmit information on the BWP set configured on the carrier(s). The processor of the UE may be configured to receive such information.

The processor may be configured to perform a CAP for performing communication in a U-band.

The processor may be configured to perform BWP-related operations based on CAP results. The BWP-related operations may include the active BWP indication, the DL-UL COT sharing, the control/data channel generation/transmission, etc. according to the embodiments of the present disclosure.

The BS 100 including the communication device may be configured to control the processor 140, the Tx 110, and the Rx 120 to perform the CAP for transmitting a DL signal in the U-band and transmit a DL Tx burst including an initial signal and a PDCCH in the U-band based on the CAP. The PDCCH included in the DL Tx burst may be transmitted to the UE with a predetermined periodicity while the DL Tx burst is transmitted.

The Tx and Rx of the UE and the BS may perform packet modulation/demodulation for data transmission, high-speed packet channel coding, OFDM packet scheduling, TDD packet scheduling, and/or channel multiplexing. Each of the UE and the BS of FIG. 27 may further include a low-power radio frequency/intermediate frequency (RF/IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi-Mode Multi-Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method performed by an apparatus operating in a wireless communication system, the method comprising:
obtaining an uplink (UL) resource comprising a plurality of frequency bandwidth units of a carrier bandwidth; and
performing a channel access procedure (CAP) for an UL transmission configured in the UL resource,
wherein the CAP is performed on the plurality of frequency bandwidth units,
wherein each of the plurality of frequency bandwidth units comprises resource blocks (RBs) that are contiguous in frequency,
wherein a bandwidth part (BWP) is configured in the carrier bandwidth, and
wherein a unit to configure the BWP is limited to a frequency bandwidth unit among the plurality of frequency bandwidth units.

2. The method of claim 1, wherein the UL resource is obtained based on downlink control information (DCI) scheduling the UL transmission.

3. The method of claim 1, further comprising: receiving information related to configuration regarding the BWP,
wherein the BWP is not configured to partially comprise respective frequency bandwidth unit included in the plurality of frequency bandwidth units.

4. The method of claim 3, wherein the BWP is configured to completely comprise respective frequency bandwidth unit included in the plurality of frequency bandwidth units.

5. The method of claim 1, further comprising: transmitting a demodulation reference signal (DM-RS),
wherein a transmission start time of the DM-RS is determined based on a predetermined method, and
wherein the predetermined method comprises at least one of:
the transmission start time of the DM-RS being determined based on a start time of the CAP and a transmission start time of the UL transmission; or
the transmission start time of the DM-RS being determined by shifting, based on the CAP, a location of a symbol to which the DM-RS is mapped.

6. The method of claim 1, wherein the UL transmission comprises a transmission block with a different redundancy version (RV) for each of the plurality of frequency bandwidth units.

7. The method of claim 6, wherein different RVs are related to different RV indices that are determined based on at least one of: (i) downlink control information (DCI) scheduling the UL transmission on the UL resource, or (ii) a function related to the plurality of frequency bandwidth units.

8. The method of claim 1, wherein at least a part of the UL transmission is not transmitted based on failing to access at least one frequency bandwidth unit among the plurality of frequency bandwidth units according to the CAP.

9. The method of claim 8, wherein the UL transmission is transmitted based on success to access all of the plurality of frequency bandwidth units according to the CAP, and
wherein the UL transmission is not transmitted based on failing to access the at least one frequency bandwidth unit according to the CAP.

10. An apparatus configured to operate in a wireless communication system, the apparatus comprising:
a memory; and
at least one processor coupled with the memory,
wherein the at least one processor is configured to:
obtain an uplink (UL) resource comprising a plurality of frequency bandwidth units of a carrier bandwidth; and
perform a channel access procedure (CAP) for an UL transmission configured in the UL resource,
wherein the CAP is performed on the plurality of frequency bandwidth units,
wherein each of the plurality of frequency bandwidth units comprises resource blocks (RBs) that are contiguous in frequency,
wherein a bandwidth part (BWP) is configured in the carrier bandwidth, and
wherein a unit to configure the BWP is limited to a frequency bandwidth unit among the plurality of frequency bandwidth units.

11. The apparatus of claim 10, wherein the UL resource is obtained based on downlink control information (DCI) scheduling the UL transmission.

12. The apparatus of claim 10, wherein the at least one processor is further configured to:
receive information related to configuration regarding the BWP,
wherein the BWP is not configured to partially comprise respective frequency bandwidth unit included in the plurality of frequency bandwidth units.

13. The apparatus of claim 12, wherein the BWP is configured to completely comprise respective frequency bandwidth unit included in the plurality of frequency bandwidth units.

14. The apparatus of claim 10, wherein the at least one processor is further configured to:
transmit a demodulation reference signal (DM-RS),
wherein a transmission start time of the DM-RS is determined based on a predetermined method, and
wherein the predetermined method comprises at least one of:
the transmission start time of the DM-RS being determined based on a start time of the CAP and a transmission start time of the UL transmission; or
the transmission start time of the DM-RS being determined by shifting, based on the CAP, a location of a symbol to which the DM-RS is mapped.

15. The apparatus of claim 10, wherein the UL transmission comprises a transmission block with a different redundancy version (RV) for each of the plurality of frequency bandwidth units.

16. The apparatus of claim 15, wherein different RVs are related to different RV indices that are determined based on at least one of: (i) downlink control information (DCI) scheduling the UL transmission on the UL resource, or (ii) a function related to the plurality of frequency bandwidth units.

17. The apparatus of claim 10, wherein at least a part of the UL transmission is not transmitted based on failing to access at least one frequency bandwidth unit among the plurality of frequency bandwidth units according to the CAP.

18. The apparatus of claim 17, wherein the UL transmission is transmitted based on success to access all of the plurality of frequency bandwidth units according to the CAP, and
wherein the UL transmission is not transmitted based on failing to access the at least one frequency bandwidth unit according to the CAP.

\* \* \* \* \*